(12) United States Patent
MacInnes et al.

(10) Patent No.: US 7,277,572 B2
(45) Date of Patent: Oct. 2, 2007

(54) THREE-DIMENSIONAL INTERIOR DESIGN SYSTEM

(75) Inventors: Cathryn MacInnes, North Reading, MA (US); Gerald Pearlstein, North Reading, MA (US)

(73) Assignee: MacPearl Design LLC, Boston, MA (US)

( * ) Notice: Subject to any disclaimer, the term of this patent is extended or adjusted under 35 U.S.C. 154(b) by 902 days.

(21) Appl. No.: 10/683,825

(22) Filed: Oct. 10, 2003

(65) Prior Publication Data

US 2005/0081161 A1 Apr. 14, 2005

(51) Int. Cl.
*G06K 9/00* (2006.01)

(52) U.S. Cl. .................. 382/154; 382/284; 382/305; 345/419; 705/27; 715/765

(58) Field of Classification Search .............. 382/154, 382/284, 294, 305; 345/419–420, 582, 778, 345/678; 705/26–27; 715/764–765, 788, 715/848, 852
See application file for complete search history.

(56) References Cited

U.S. PATENT DOCUMENTS

| | | | |
|---|---|---|---|
| 5,255,352 A | 10/1993 | Falk | |
| 5,940,806 A | 8/1999 | Danial | |
| 5,986,670 A * | 11/1999 | Dries et al. | 345/629 |
| 6,005,969 A | 12/1999 | Thomas et al. | |
| 6,091,422 A * | 7/2000 | Ouaknine et al. | 345/419 |
| 6,727,925 B1 * | 4/2004 | Bourdelais | 715/852 |
| 7,062,722 B1 * | 6/2006 | Carlin et al. | 715/850 |
| 2002/0010655 A1 * | 1/2002 | Kjallstrom | 705/27 |
| 2002/0093538 A1 | 7/2002 | Carlin | |

* cited by examiner

*Primary Examiner*—Daniel Mariam
(74) *Attorney, Agent, or Firm*—Sampson & Associates, P.C.

(57) ABSTRACT

A system and method in a client-server computing environment is provided for generating and rendering a photorealistic three-dimensional (3D) perspective view of a 3D object selectively positioned within a 3D scene. A client is configured for communicably accessing a server, and includes a client application configured for scene editing and rendering, using a graphical user interface (GUI). The 3D scene may be selectively displayed in a plurality of views, and a 3D object may be retrieved from the server and imported into the 3D scene to generate a composite. The 3D object may also be manipulated within the composite for placement and orientation. A 3D image of the composite may then be rendered at the client and selectively reconfigured in real time. Luminosity characteristics may be applied to the 3D image; followed by rendering a photorealistic 3D view of the composite image.

30 Claims, 29 Drawing Sheets

THREE-DIMENSIONAL INTERIOR DESIGN SYSTEM

BACKGROUND

1. Technical Field

This invention relates to computerized three-dimensional modeling systems, and more particularly, to a software application configured to reside on a client computer, which is capable of manipulating 3-D object representations in-situ with a user-selected or user-generated interior design scene, and rendering photographic quality perspective images of the composite scene.

2. Background Information

Throughout this application, various publications, patents and published patent applications are referred to by an identifying citation. The disclosures of the publications, patents and published patent applications referenced in this application are hereby incorporated by reference into the present disclosure.

Many systems have been devised to provide various design and modeling functionality. For example, U.S. Pat. No. 5,255,352 to Falk for MAPPING OF TWO-DIMENSIONAL SURFACE DETAIL ON THREE-DIMENSIONAL SURFACES concerns a system and method for providing surface detail to mathematically-defined three-dimensional surfaces which preserves the specific dimensional integrity of the surface detail image being mapped in order to provide dimensionally correct surface detail. This is accomplished by performing the intermediate step of mapping the surface detail image to a two-dimensional flattened pattern piece representation of the surface and thereafter mapping this representation to the three-dimensional surface.

U.S. Pat. No. 5,940,806 to Danial for a METHOD AND APPARATUS FOR RECEIVING, STORING AND PROVIDING DATA CORRESPONDING TO GEOMETRICALLY DESCRIBABLE RAW MATERIALS concerns an apparatus and method employing a programmable computer for providing a list of data items corresponding to geometrically describable materials based upon a profile specified by a user. The list of data items is stored in a database. Each data item includes geometrically descriptive terms and trading parameters identifying characteristics of an item offered for sale by an advertiser. A profile is generated by a user that includes geometrically descriptive terms and trading parameters identifying characteristics of an item sought for purchase by the user. The profile identified by the user is compared to each data item stored in the database and data items are identified which match the profile. The data items identified are provided to the user in accordance with the user's specific delivery instructions.

U.S. Pat. No. 6,005,969 to Thomas, et. al., concerns METHODS AND SYSTEMS FOR MANIPULATION OF IMAGES OF FLOOR COVERINGS OR OTHER FABRICS that enable a fabric or textile sampling and design process. The sampling and design process is claimed to be valuable in the design and selection of floor coverings, wall coverings and other interior design treatments. A digital library of fabric models is created. A user may navigate among the set of alternative models, and may modify the positions of the selected models to test out desired combinations of characteristics—such as poms or yarn ends, or models of floor coverings—and view the results in high resolution. A method is provided for substituting colors in digital images, while preserving their realism particularly in the vicinity of shadows. The resulting samples or designs can be stored and transmitted over a telecommunications network or by other means to a central facility that can either generate photographic-quality images of the samples, or can directly generate actual samples of the carpet or other material of interest.

At least one previous upholstered furniture customization system involves a real-time network-based interactive system for support of visualizing upholstered furniture prior to placing an order for the upholstered furniture. This existing interactive system of La-Z-Boy™ Incorporated, and possibly others, is available for use by sales associates in La-Z-Boy™ furniture showrooms. The system permits prospective customers to preview La-Z-Boy™ furniture upholstered in La-Z-Boy™ offered fabrics. It requires a La-Z-Boy™ furniture item number, and a La-Z-Boy™ fabric number. The system then maps the fabric onto a static perspective view of the selected furniture item.

This system generates furniture images in 2D as opposed to 3D, does not enable them to be shown in context of a background scene (e.g., a particular room), and does not enable them to be manipulated, e.g., for scaling, rotation and particular placement within the background scenes.

Image systems and methods also exist, which involve communications across a digital communications network such as the Internet. One such network-based system, which generates 2D, rather than 3D images is the called the cMyVision™ design software for use in interior, exterior, home and landscape improvement. The cMyVision™ software is a product, and cMyVision™ web site a service, of Visual Applications, Inc. (VisApp), of Kansas City, Mo. (cMyVision™ is a trademark of VisApp.) VisApp is a publisher of personal visualization technology, with a web site at <http://www.visapp.com> of the year 2000.

The cMyVision™ design software requires a digital photo of a house, normally the client's own house. Into this 2D scene a 2D object is inserted from the cMyVision library, or database. The cMyvision system operates to produce two-dimensional (2D), rather than 3D images.

VisApp also sells a product called VisualPhile™ Personal Visualization Software, purportedly to support professional interior remodeling and design. This software appears to provide the same features as the cMyvision™ system. It runs on a personal computer without an Internet connection, as its library is included with the program. It is primarily suited to providing photorealistic visualizations of home remodeling as opposed to decorating projects. As in cMyVision™, a certain degree of photorealism stems from the use of photographs for both rooms and built-ins, appliances and furnishings.

However, there exist inherent limitations to both the cMyVision™ and VisualPhile™ systems, which may be severe when applied to professional interior design, relative to their use of digital photographs. These systems are not based upon 3D coordinates, so furniture images have to be placed and scaled visually by the user, and the furniture objects are 2D images, so they cannot be rotated to match the angle of the room photograph (as may seen to be the case in the present invention). Therefore, in both the cMyVision™ and VisualPhile™ systems, room photos must be taken from a specified perspective (i.e., vantage point), which must be carefully configured to match the angle from which their furniture photographs are taken. Moreover, because the furniture images are only photographs, and not 3D models, it is generally not possible to map fabrics on them.

A number of stand alone software programs are commercially available which support interior design. These programs generally run on personal computers and allow the user to design rooms, place furniture objects into rooms, change wall colors and furniture fabrics, and display the customized furniture in the decorated rooms. Custom Home 3-D Design and Décor™, published by Sierra On-line, Inc., 5 in 1 Home Design™ by Punch! Software LLC, and 3D Home Interiors™ by Broderbund all support most of these design-assistance and visualization objectives. In addition, numerous commercially-available programs support architectural rendering, including computer-aided design (CAD) programs like AutoCAD, which incorporate 3-D functionality and therefore have application to interior design.

The Custom Home 3-D Design and Décor™ product includes a program called Photo Home Interiors™. This program, unlike the others, allows users to import photographs of actual rooms into the program, and then place furniture objects into the room images. The objects include 3-D furniture models, which can be rotated and scaled to fit the scene. However, the room images are not associated with a 3-D model of the room. In other words, while Photo Home Interiors™ does allow furniture objects to be shown as an overlay on top of room photographs, it lacks the capability of rendering furniture objects placed onto floor plans in photographically-derived scenes. Therefore, this program does not allow wall and floor coverings to be displayed in the proper perspective. In addition, the 3-D objects need to be visually scaled by the user to compensate for the perceived distance from the camera position. With this system, it is not possible to evaluate furniture objects of specific dimensions as to scale.

Three-dimensional (3D) image capture technology is commercially available, such as from Minolta Co., Ltd The Minolta VIVID 910 Non-contact 3-D digitizer is a complete hardware/software package that utilizes laser triangulation in conjunction with a Minolta CCD camera. The system is packaged with a basic Polygon Editing Tool. This system may be enhanced with various optional software packages such as Geomagic Studio from Raindrop Geomagic, Inc., Research Triangle Park, N.C. 27709 that provides numerous features to create 3-D models which can be transmitted over a network for further manipulation.

Other commercially available 3D imaging tools include a Web3D Browser. This is a piece of software that lets a user view and navigate around a 3D scene over the Web, for example a VRML (Virtual Reality Modeling Language) file. These browsers can either be stand alone programs or, more typically, they are plug-ins for common Web browsers such as Netscape Communicator™ or Internet Explorer™. A number of companies produce Web3D products. A few of the common systems include the following: Actify 3DView, Contact from Blaxxun Interactive; Cortona from Parallel-Graphics; Cosmo Player from Platinum Technologies; Fraunhofer Institute CASUS Presenter; Graz University VRWave; Java X3D Browser; OpenWorlds Horizon Browsers; Shout3d from Eyematic; Sony Community Place; Superscape Viscape Support; UpperCut Software World-Probe. A more complete list of Web3D browser software can be found at the Web3D web site www.web3d.org.

One system that purports to address the drawbacks associated with many of the above-referenced systems is disclosed in U.S. patent application Ser. No. 2002/0093538. This reference discloses a software-based system for (i) interactively producing, and (ii) rendering, across a digital communications network, photorealistic composite images of interactively customized products in such surroundings as are customary to and specified by the viewer of the image. This system discloses photorealistically displaying goods selected by a user in situ with an environment also selected or specified by the user to generate a photorealistic image using computational resources of the user's client computer to "frame" the scene, and the greater computational resources of a server and allied computers to, ultimately, render the 3D objects in a 3D scene to form a "photorealistic composite".

While this system may overcome some of the disadvantages of the prior art, it is not without drawbacks, not the least of which is the time lag associated with uploading the "frame" of the scene, waiting for the server to render the 3D composite, and downloading a relatively large file or array of files. Moreover, additional changes made after such rendering, such as moving objects within the scene, presumably cannot be effected at the client computer. Rather, any such changes would require the user to re-create or edit the "frame", re-transmit it to the server, and again wait for the new composite to be rendered and downloaded.

Thus, a need exists for an improved 3D design and visualization system that includes an easy to use Graphical User Interface (GUI), is capable of enabling a user to quickly and conveniently generate or import 3D scenes, import and manipulate 3D objects in the scenes in real time, and which is capable of rendering them in photorealistic detail on the client computer.

SUMMARY

One aspect of the present invention includes a method in a client-server computing environment for generating and rendering a photorealistic three-dimensional (3D) perspective view of a 3D object selectively positioned within a 3D scene. The method includes communicably accessing a server with a client; operating with the client, a client application configured for scene editing and rendering, including a graphical user interface (GUI); and displaying a 3D scene with the GUI. The method also includes configuring the 3D scene for being selectively displayed in a plurality of views; retrieving at least one 3D object from the server; importing the 3D object into the 3D scene to generate a composite; and manipulating the 3D object within the composite for placement and orientation. A 3D image of the composite may then be rendered at the client; and selectively reconfigured in real time. Luminosity characteristics may be applied to the 3D image; followed by rendering, with the client application, a photorealistic 3D view of the composite image, including the luminosity characteristics.

Another aspect of the present invention includes a method in a client-server computing environment for generating and rendering a photorealistic three-dimensional (3D) perspective view of a 3D object selectively positioned within a 3D scene. The method includes loading a plurality of 3D objects onto a server, at least one of the 3D objects representing a product; loading product ordering information for each product onto the server; loading a client application configured for scene editing and rendering, including a graphical user interface (GUI), onto the server; combining the plurality of 3D objects, with their integrated product ordering information, to form integrated 3D objects; converting the integrated 3D objects into a format usable by the client application; storing the integrated formatted 3D objects in a server library; communicably coupling the server to a client; and transmitting the client application to the client. The method also includes transmitting selected ones of plurality of 3D objects from the server library to a client library; automatically updating the plurality of 3D objects in the server library, including their associated product ordering information; and automatically transmitting updates for the selected ones of 3D objects in the server library, to the client; so that a user may manipulate the selected 3D objects with the client application to generate a 3D scene at the client.

A further aspect of the invention includes a computer system in an interactive medium for generating and rendering a photorealistic three-dimensional (3D) perspective view of a 3D object selectively positioned within a 3D scene. The system includes a server having a plurality of 3D objects, each of the 3D objects representing a product; product ordering information for each of the plurality of objects; integrated 3D objects, including the plurality of 3D objects with their integrated product ordering information; a converter configured to convert the integrated 3D objects into a format usable by the client application; and a server library containing the formatted, integrated 3D objects. A communication module is configured to communicably couple the server to a client; an update module is configured to automatically update the plurality of 3D objects in the server library for dimensional and product ordering changes; and a client is communicably couplable to the server. The client includes a communication module configured to access the server; a client application configured for scene editing and rendering, including a graphical user interface (GUI); a 3D scene; and a display module configured selectively display the 3D scene in a plurality of views. The client application also includes a retrieval module configured to retrieve at least one 3D object from the server; an import module configured to import the 3D object into the 3D scene to generate a composite; a manipulation module to manipulate the 3D object within the composite for placement and orientation; a first rendering engine for rendering a 3D image of the composite at the client; a reconfiguration module to selectively reconfigure the 3D image in real time; a luminosity module to apply luminosity characteristics to the 3D image; and a second rendering engine configured to render a photorealistic 3D view of the composite image, including the luminosity characteristics.

A still further aspect of the present invention includes a computer system in an interactive medium for generating customized graphical documents, the system including a server being communicably couplable to a client. The server includes a plurality of 3D objects, each of the 3D objects representing a product; product ordering information for each of the plurality of objects; a client application configured for scene editing and rendering, including a graphical user interface (GUI); integrated 3D objects including the plurality of 3D objects with their integrated product ordering information; a converter configured to convert the integrated 3D objects into a format usable by the client application; a server library containing the integrated 3D objects, formatted into the format usable by the client application; a communication module configured to communicably couple the server to a client; and an update module configured to automatically update the plurality of 3D objects in the server library for dimensional and product ordering changes.

In a yet further aspect, the invention includes a computer system in an interactive medium for generating customized graphical documents, the system including a client communicably couplable to a server. The client includes a communication module configured to access the server; a client application configured for scene editing and rendering, including a graphical user interface (GUI); a 3D scene; a display module configured selectively display the 3D scene in a plurality of views; a retrieval module configured to retrieve at least one 3D object from the server; an import module configured to import the 3D object into the 3D scene to generate a composite; a manipulation module to manipulate the 3D object within the composite for placement and orientation; a first rendering engine for rendering a 3D image of the composite at the client; a reconfiguration module to selectively reconfigure the 3D image in real time; a luminosity module to apply luminosity characteristics to the 3D image; and a second rendering engine configured to render a photorealistic 3D view of the composite image, including the luminosity characteristics.

BRIEF DESCRIPTION OF THE DRAWINGS

The above and other features and advantages of this invention may be more readily apparent from a reading of the following detailed description of various aspects of the invention taken in conjunction with the accompanying drawings, in which.

DETAILED DESCRIPTION

Figure 1:
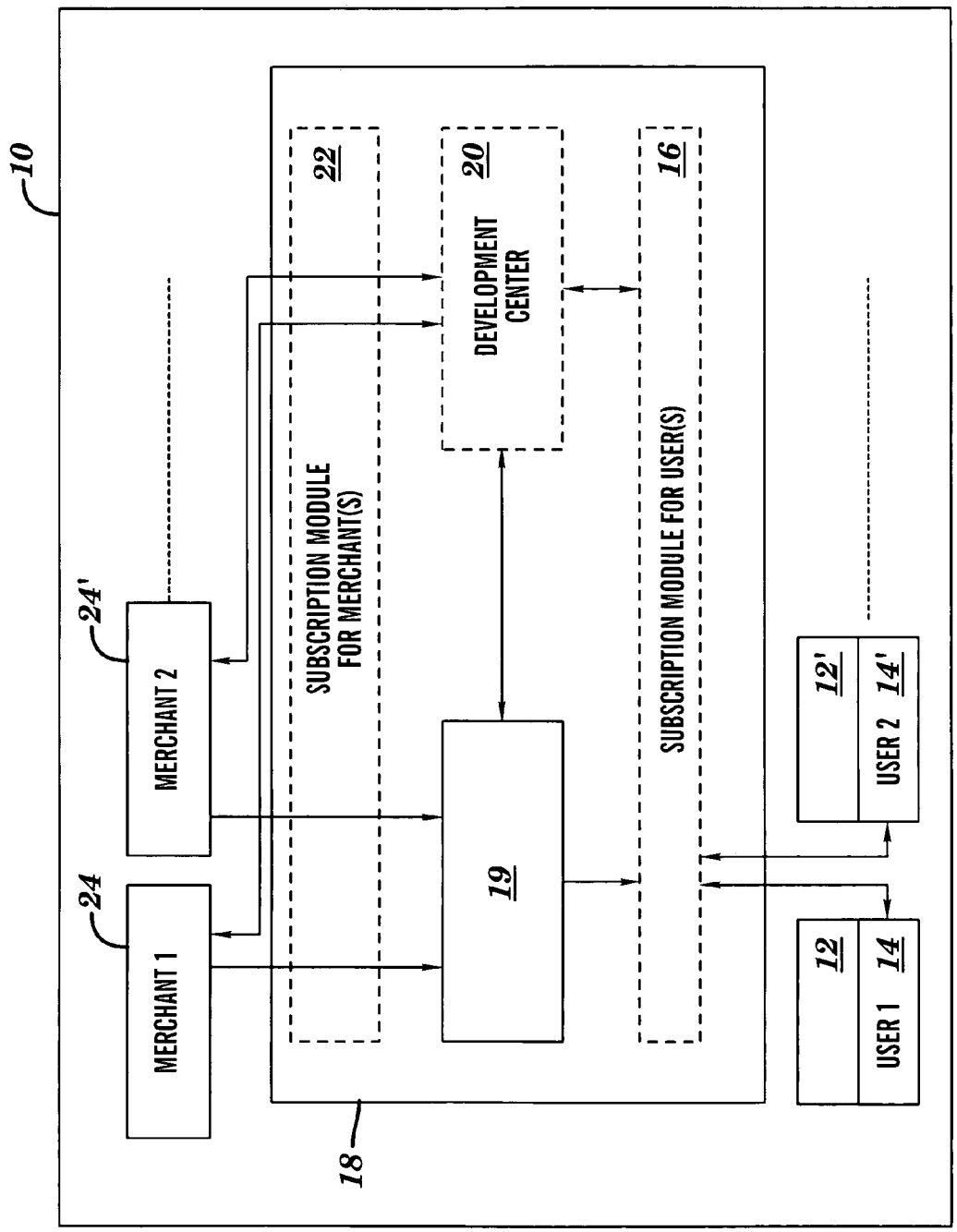
FIG. 1 is a high level functional block diagram of an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings shall be indicated with like reference numerals and similar features as shown in alternate embodiments in the drawings shall be indicated with similar reference numerals.

Embodiments of the present invention include a system capable of depicting a realistic 3D rendering of a space with architectural and design elements therein capable of real time, user-friendly manipulation. The system may be used by Interior Designers and Architects, as well as other professionals in related fields, to easily design interior spaces for their clients with the help of an intuitive and easy to use custom interface. The resulting design may then be displayed on any number of suitable displays, which may include a stereoscopically projected room-size large screen format of a conventional Immersive Visualization display. This embodiment thus enhances the ability of these professionals ('users') to effectively communicate with their clients and improve customer visualization of proposed designs.

Manufacturers may also use embodiments of the invention to showcase their products. It will allow end users to see a manufacturer's products in full, realistic, 3D with the ability to change the texture (textile covering, finish, etc.) of the product. These embodiments may allow a furniture manufacturer to exhibit their sofas or chairs covered in all of the different materials offered by them or by any other manufacturer as well as to show all sides of the furniture via the ability to orbit the object on all axes. The textile manufacturer may also exhibit its entire line on another manufacturer's products.

Embodiments of the present invention also provide the ability to represent changes in both natural and artificial light, which in particular embodiments, may be as precise as to depict lighting associated with a particular exposure during a particular season at a predetermined hour of the day at a particular geographic location worldwide.

Users of these embodiments may be provided with access to an internal (e.g., bundled with the client application) library, and a web-based library of 3D models of furnishings and decorative art objects as well as images of 2D and 3D decorative finishes and architectural elements commonly utilized in the design of interior spaces. These models and images are referred to as 'objects' herein. In desired embodiments, an object library is maintained at a central repository, to which a user may access to download 3D objects of their choice. A development center may also be provided, to generate enhanced versions of existing 3D objects and to generate new objects, such as upon request by manufacturers of interior furnishings, or upon request of interior designers. The development center may generate 3D objects through use of laser scan and other conventional image capturing equipment, and may acquire existing 3D objects (e.g., CAD drawings) from manufacturers. These embodiments, including access to manufacturer's 3D objects, and to their product specifications such as available colors, textures, and manufacturing lead times, may enable the user to calculate and track design costs by project (e.g., MSRP of products, numbers of gallons of paint, rolls of wallpaper, square feet of carpeting), to accurately represent, specify, and ultimately order particular available products. These embodiments may also provide the user with Internet links (e.g., URLs) to industry sources and related government sources.

Where used in this disclosure, the term "computer" is meant to encompass a workstation, personal computer, personal digital assistant (PDA), wireless telephone, server, or any other suitable computing device. Exemplary computers suitable for running client application 12 of the present invention include a personal computer (PC) including an Intel Pentium III or IV processor or equivalent, CD-RW Drive, Keyboard, Mouse, Tablet/Digitiser, Serial, Parallel, and USB Ports. Client and server is computers according to this invention may be coupled to each other using links that may include one or more local area networks (LANs), metropolitan area networks (MANs), wide area networks (WANs), a portion of the global computer network known as the Internet, or any other appropriate wireline, wireless, or other links. The components of the server(s) disclosed herein may operate on one or more computers at one or more locations, and may share one or more computers or other resources with one or more customers or merchants, according to particular needs. User requests may be submitted to the server in any suitable format, such as in the form of Hypertext Markup Language (HTML) or Extensible Markup Language (XML) files. The term "photorealistic" refers to images having a resolution and color accuracy similar to that of conventional professional quality color photographs, even if displayed on a monitor or other viewing device which is incapable of displaying the full resolution of the image (such as in the event a monochrome or relatively low quality color monitor is being used).

Embodiments of the present invention may be used by interior design professionals. The system and tool of these embodiments permit designers and their clients to select, customize and rearrange groupings of furnishings to see how they may look within the client's actual room in a WYSIWYG (What You See Is What You Get) environment. These embodiments include each of (i) a large on-line catalog containing 3D images and information for textures and furnishings, which may include fabric, wallpaper, paint colors and finishes, wood finishes upholstered furniture, case goods, art, art objects and decorative accessories, (ii) a library of 3D room models that may be interactively sized, an interactive 3D room model generator containing a floor plan tool, and (iii) a library of 3D furnishings models.

By manipulating images of actual rooms with the client application of the present invention, designers may be able to simply and quickly produce photorealistic images of their vision. Features including lighting effects and highly detailed models of furnishings permit the rendered, composite images to appear photorealistic.

Interior designer and architect users may then design by (i) using the easy to use GUI and visualization tools of the present invention to virtually decorate interior spaces for residential, commercial and entertainment applications to professional standards; (ii) select and then view fabrics and finishes at high magnification to see intricate detail by utilizing zoom technology; (iii) apply a large selection of fine fabrics and finishes to intricate 3D models of furniture, pillows and cushions to create a composite image of the room being decorated, all by use of a simple graphical user interface, and (iv) design and "see" private-label high-end custom furniture and furnishings in various sizes, configurations, styles, veneers and finishes.

To render, interior designer and architect users may (i) specify lighting, camera position and other rendering options; (ii) use the client-resident system to create photorealistic renderings of their designs without having to rely on a separate remote rendering facility.

Interior designer and architect users may showcase renderings of completed projects to prospective clients. A zoom tool may be available here as well, to aid viewers in examining areas of the image they wish to view in greater detail.

Referring now to the Figures, specific embodiments of the present invention are described in detail.

Turning now to FIG. 1, an embodiment of the present invention is shown as system which includes a client application 12 configured to reside on a user's computer (variously referred to herein as a 'user' or 'client') 14. As shown, system 10 may be configured for multiple client computers, 14, 14', etc., each running an application 12, 12', etc. The client applications 12, 12' are communicably coupled, e.g., through a network such as the Internet, to a central server 18. Server 18 optionally includes a user subscription module 16 operatively engaged with both an object repository (library/database) 19 and an optional development center module 20. Subscription module 16 provides users 14, 14', with selective, subscription-based access to server 18 and/or development center 20. Library 19 includes objects that may be downloaded by users 14, 14' for importation to, and manipulation within a scene at the client application 12, 12'. Requests may be sent to development center module 20 by users 14, 14' and/or byproduct manufacturers/merchants 24, 24', to generate a 3D object model of a particular product, as discussed hereinbelow with respect to FIG. 2.

Server 18 and/or development center module 20 may be coupled, via an optional merchant subscription module 22 to one or more merchants 24, 24', etc. Such connection enables the merchants to upload 3D models (objects) 33 (see FIG. 7) of their products to server 18. The merchants may upload their 3D models in an agreed-upon format (such as the well-known .dxf or .dwg formats as well as the CATIA V4, PARASOLID, IGES, SAT, or STEP formats), for integration into object library 19. In particular embodiments, merchants 24, 24' also upload product ordering information such as available options (e.g., colors, textures, sizes, etc.) and availability, manufacturing lead times, etc. This information is stored with the 3D models in library 19, to enable users to accurately specify and subsequently order their products, as will be described in greater detail hereinbelow.

The merchants may optionally communicate with development center module 20 for custom development of 3D models, or to convert pre-existing 3D models into the agreed-upon format used by server 18/library 19. Moreover, users 14, 14' may also upload their own 3D models to center 20, for further development and/or format conversion suitable for use with application 12, 12'. A converter may also be included with various embodiments of the invention to allow merchants 24, 24' and users 14, 14' to convert their 3D models to a format (e.g., SAT format) suitable for use with application 12, 12'. It should be recognized that although various functions are described herein with respect to development center module 20, such functionality may be provided either by module 20 itself, or by a remote module(s) communicably linked to the module 20, without departing from the spirit and scope of the present invention.

Users 14, 14', upon initiating their subscriptions, are able to access library 19 to download models, and synchronize their local library with the current models of library 19, as will be discussed in greater detail hereinbelow.

Figure 2:
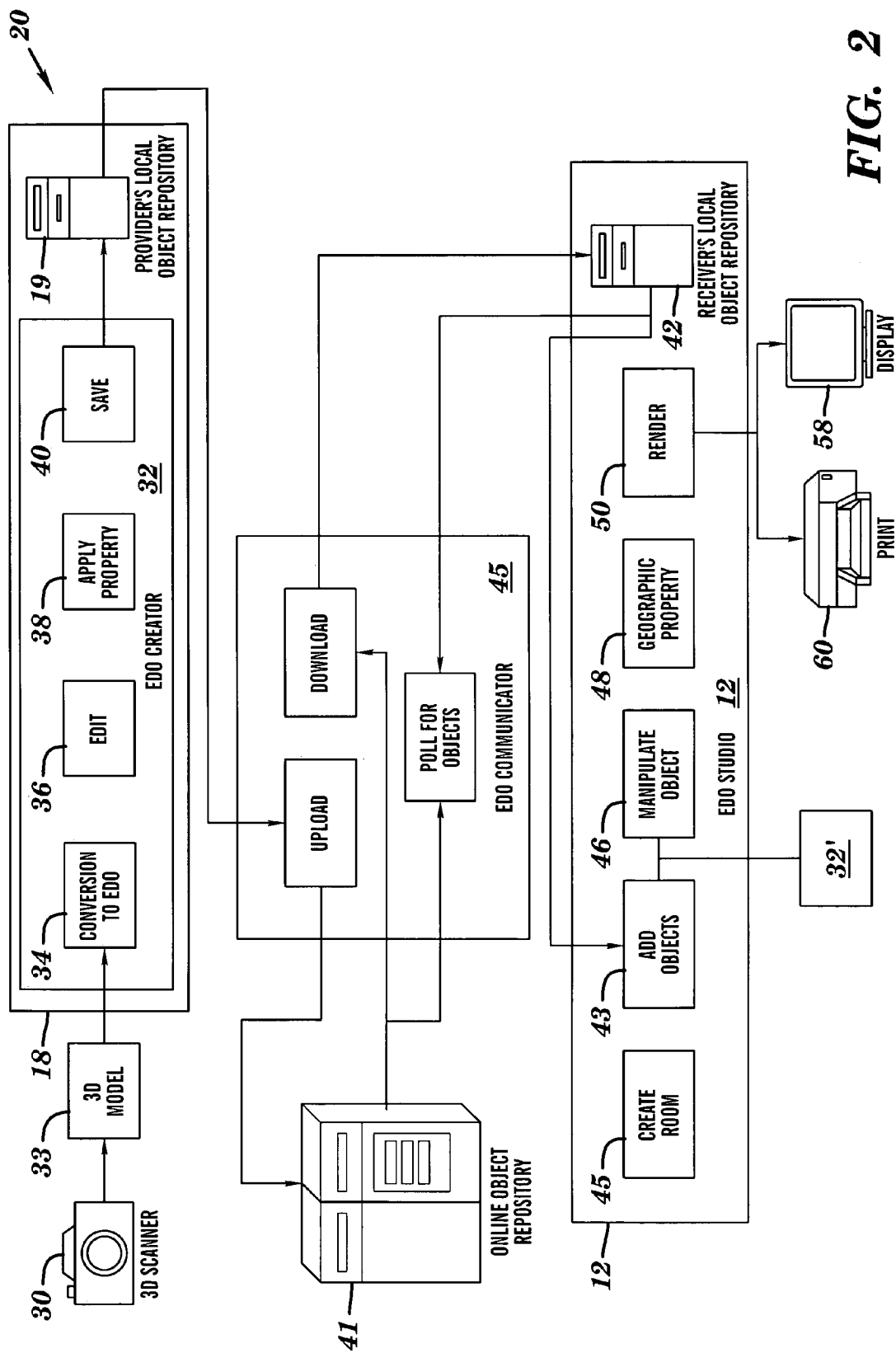
FIG. 2 is lower level architectural diagram of portions of the embodiment of FIG. 1.

Turning now to FIG. 2, aspects of server 18, including optional development center module 20, and application 12, 12' are described in greater detail. As shown, development center 20 is configured to receive 3D images 33 captured by a conventional 3D scanner 30, such as the VIVID 910 Non-contact 3-D Digitizer from Minolta Co. Ltd Using the captured image, center 20 may then use object creator module 32 of the present invention to transform the image into an object suitable for use by client application 12, 12'. As shown, module 32 includes a conversion module 34 configured to convert the image to the desired format discussed hereinabove. The formatted image may then be edited (e.g., for size) using edit module 36. Property module 38 may be used to apply desired properties, such as textures and colors. Module 40 saves the substantially completed object to the object repository 19 associated with development center 20. In this manner, repository 19 may be populated with multiple versions of otherwise identical objects configured with distinct properties. For example four objects may be provided to correspond to a single chair in each of the four fabrics provided by the chair's manufacturer. The objects may be further manipulated, or new objects/properties created/applied (e.g., textures or colors that are not offered by the particular manufacturer), by a user version of object creator module 32' associated with client application 12, 12', which is discussed in greater detail hereinbelow.

As discussed hereinabove, objects of library 19 may be downloaded, e.g., via an online object repository 41, to local library 42 of application 12. In an exemplary embodiment, this file transfer is effected by one or more communicator modules 45, which may include a conventional file transfer utility, e.g., an .ftp client, running on the client computer. Although only one module 45 is shown, the skilled artisan should recognize that a communicator module 45 may be instantiated at each node of the system, e.g., at each client 12, 12', server 18, and online object repository 41 in the event repository 41 is located remotely from server 18.

A user may then use client application 12 to open a scene/design, e.g., create a room using module 45. Selected objects 43 may then be chosen from local library 42 and placed into the user's open scene/design, where they may be edited for e.g., size, texture, by a local instantiation of module 32'. Manipulation, geographic/luminosity property, and rendering modules 46, 48, and 50, respectively, may then be used to manipulate, and add effects such as lighting customized for location, season, and/or time of day. Rendering module 50 may then be used to generate a 3-D rendering of the completed scene (or to save the scene as a 2D image), in a format suitable for being displayed or printed by a conventional display 58 or printer 60 in either low or high resolution, as discussed in greater detail hereinbelow.

Display 58 may comprise any suitable commercially available device, such as a conventional computer display, television or video monitor.

Although embodiments of the present invention have been shown and described as a system having both client and server portions, the skilled artisan should recognize that either the client or server portions may be implemented individually, without departing from the spirit and scope of the present invention.

Figure 3:
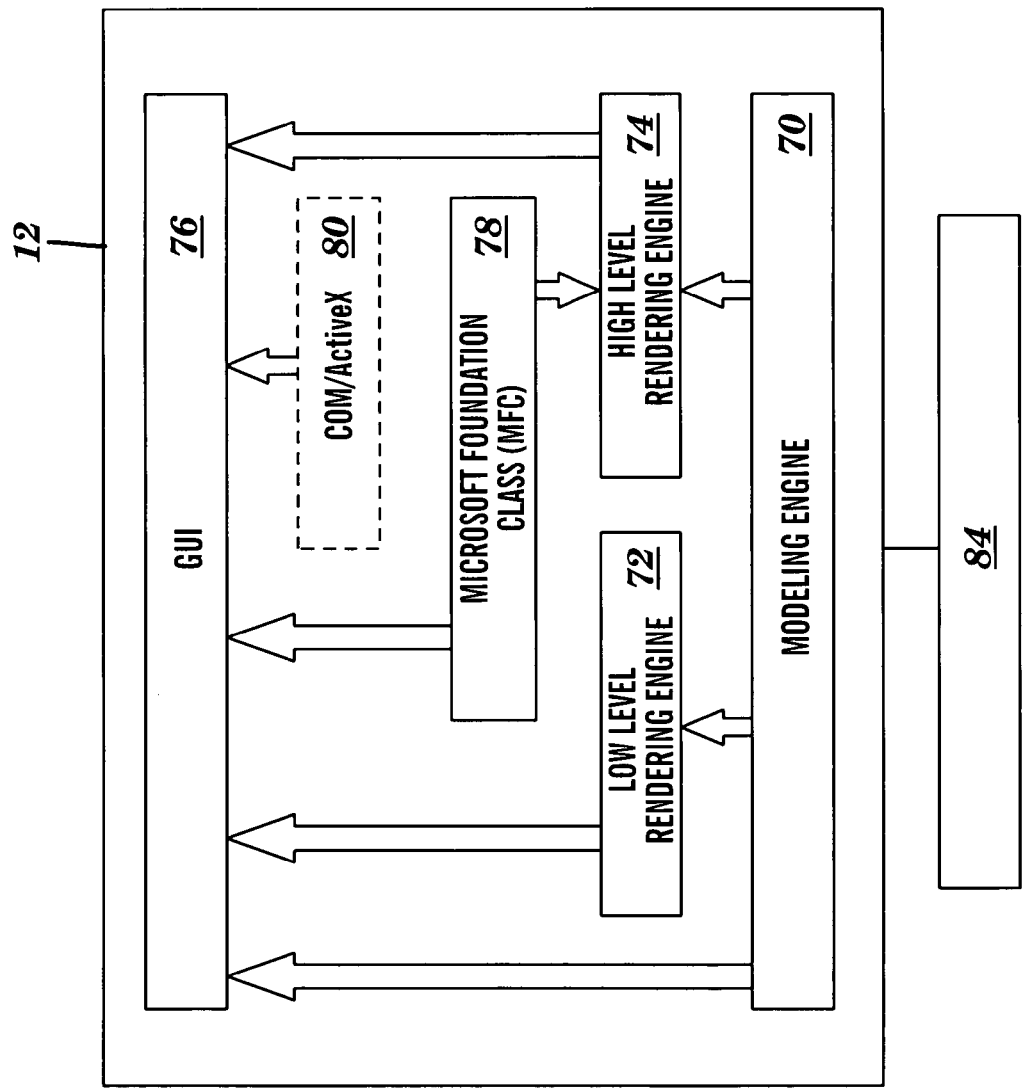
FIG. 3 is a lower level architectural diagram of a portion of the embodiment of FIG. 2.

Turning now to FIG. 3, the architecture of an exemplary embodiment of client application 12 is described. As shown, application 12 includes a modeling engine 70, coupled to low level rendering engine 72, and to high level rendering engine 74. Each of the engines 70, 72, and 74 are communicably coupled to a GUI 76. High level rendering engine 74 is coupled to GUI 76 via a core 78, which, in the embodiment shown, provides conventional low level functionality that facilitates interfacing of application 12 with the underlying operating system (e.g., WINDOWS™, Microsoft Corporation, Redmund, Wash.) of computer 14. Optionally, an ACTIVE X™ (Microsoft Corporation) module 80 may also be provided, to conveniently provide additional well-known ACTIVEX™ fluctionality, such as controls for sizing GUI windows.

In the example shown, core 78 is embodied in a commercially available Microsoft® Foundation Class (MFC) module, version 4.0 (MFC 4.0) available from Microsoft® Corporation. MFC 4.0 includes the core set of functionality of MFC 1.0, the architecture and pre-built high-level abstractions added in MFC 2.0, the OLE and Open Database Connectivity (ODBC) functionality added in MFC 2.5 and MFC 3.0, and the user-interface and Windows Open Services Architecture (WOSA) features of MFC 3.1 and 3.2. MFC makes it possible to write professional, full-featured Windows-based applications in less time than it would take using the C programming language and the Software Development Kit (SDK) or other application frameworks.

MFC 4.0 offers a high level of abstraction that provides convenient access to the native Windows API. MFC 4.0 uses a safe subset of the C++ language. Users of MFC do not have to be experts who understand all the details and idiosyncrasies of the C++ language. At the same time, more experienced C++ developers can use more advanced features of the language and still access the power of MFC.

In this exemplary embodiment, modeling engine 70 includes the 3D ACIS Modeler™ R10 modeling product (Spatial Corp, Westminster, Col., www.spatial.com).

An exemplary high level rendering engine 74 is Light-Works™ version 7.2 module (LightWork Design of Sheffield, U.K., www.lightworkdesign.com). A low level engine 72 suitable for use with embodiments of the present invention is the HOOPS 3D™ Product Suite, version 8, solid/surface modeling tools (Tech Soft America, Oakland, Calif., www.hoops3d.com), which provides core component technologies for 3D applications, to provide graphic effects such as shading, lighting, texture mapping, and matrix transformations. Operation of engines 74 and 72 will be discussed in greater detail hereinbelow.

Figure 4:
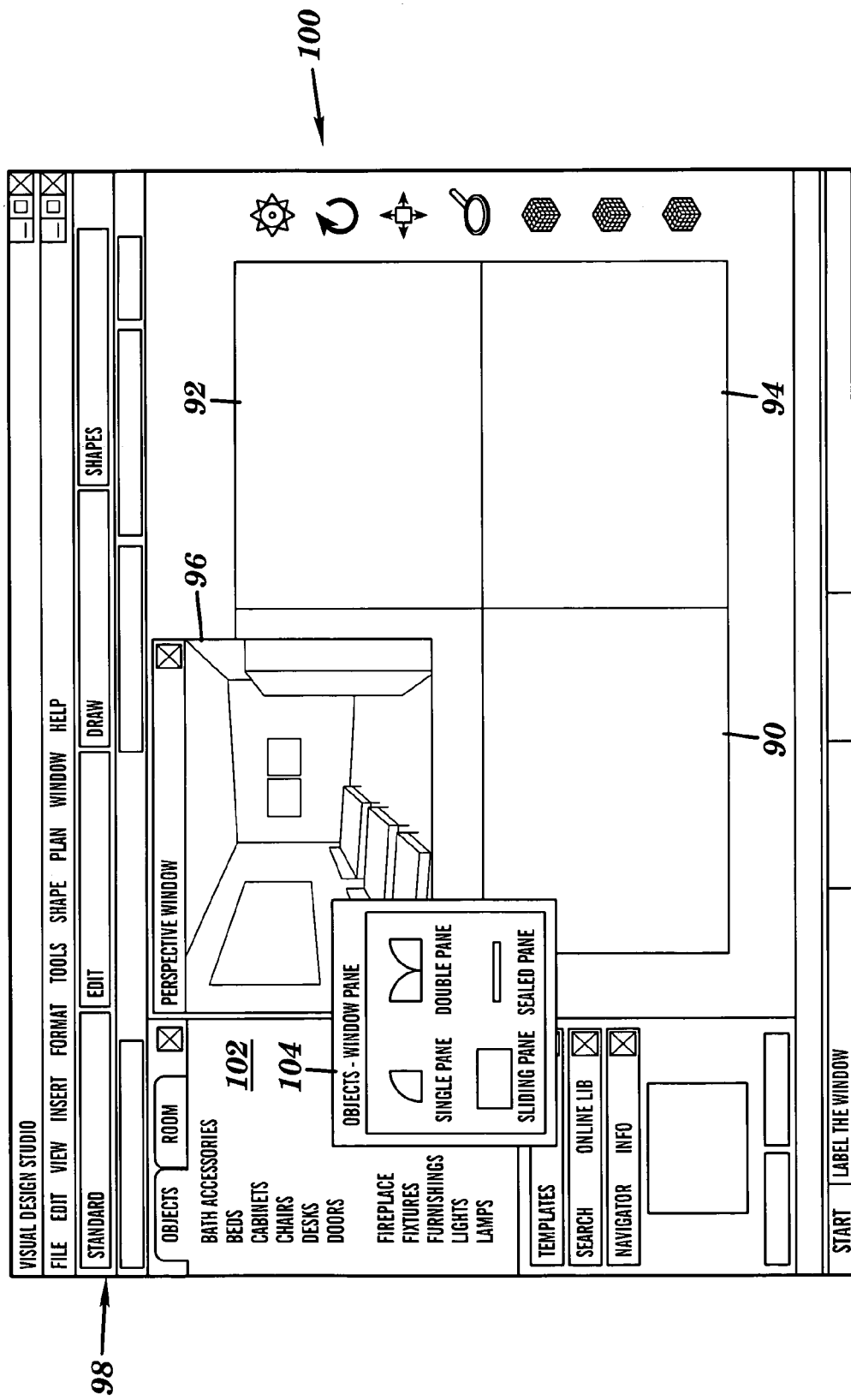
FIG. 4 is a representative screen display generated by the embodiment of FIGS. 1-3.

Referring now to FIG. 4, a representative screen display generated by an embodiment of GUI 76 is illustrated. As shown, GUI 76 includes the capability to show various views, such as plan (floor) 90, elevation (wall) 92, low resolution (e.g., wireframe) perspective 94 and high resolution (photorealistic) perspective 96. Toolbars 98 and 100 enable a user to effect various drawing functions familiar to those skilled in the art, such as described hereinbelow. In addition, a list 102 of object categories/types is provided, and which enable a user to drill down to open additional dialogs, such as shown in window 104, to display various parameters associated with the selected object category.

Figure 5:
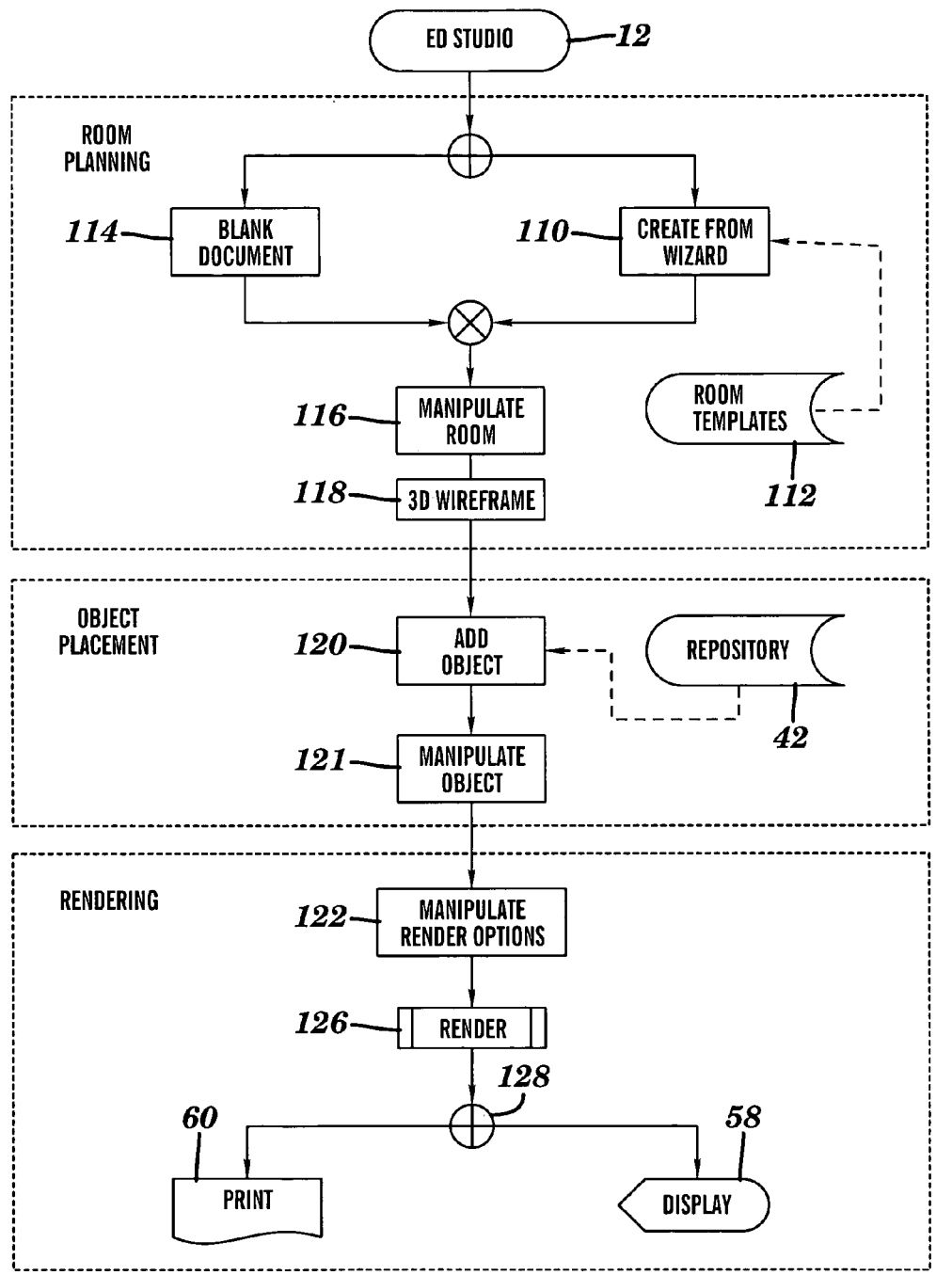
FIG. 5 is a flow diagram of operation of the embodiment of FIG. 4.

Turning now to FIG. 5, high level operation of system 12 is described. As shown, initial operation involves room planning, either by running a wizard 110 (which may include importing 112 a template stored as an object in library 19, 42 (FIG. 2)), or by generating 114 a 2D plan from a blank document. The user may then edit 116 the room plan as desired.

Once the room plan has been created, the user may add 120 objects 43 (FIG. 2) selected from local object library 42 and/or online library 41 (FIG. 2). The objects may be manipulated 121, such as for position (e.g., placement, rotation) and property (e.g., texture, color, etc.).

Once the room plan is substantially complete, rendering options may be applied 122, which may include geographic properties discussed hereinabove. For example, luminosity effects, including ray tracing, radiosity, shadow effects, layering, texturing, and combinations thereof, may be automatically applied to simulate the effect of natural light at a particular geographic location, orientation (e.g., North, South, East, West), time of year, and time of day.

The image may then be saved and rendered 126, and outputted 128, such as to a display 58 (e.g., computer display and/or 3D projector) or printer 60.

Having described the general functionality of embodiments of the present invention, the following is more detailed description of a particular embodiment thereof.

User Interface Characteristics

Figure 6:
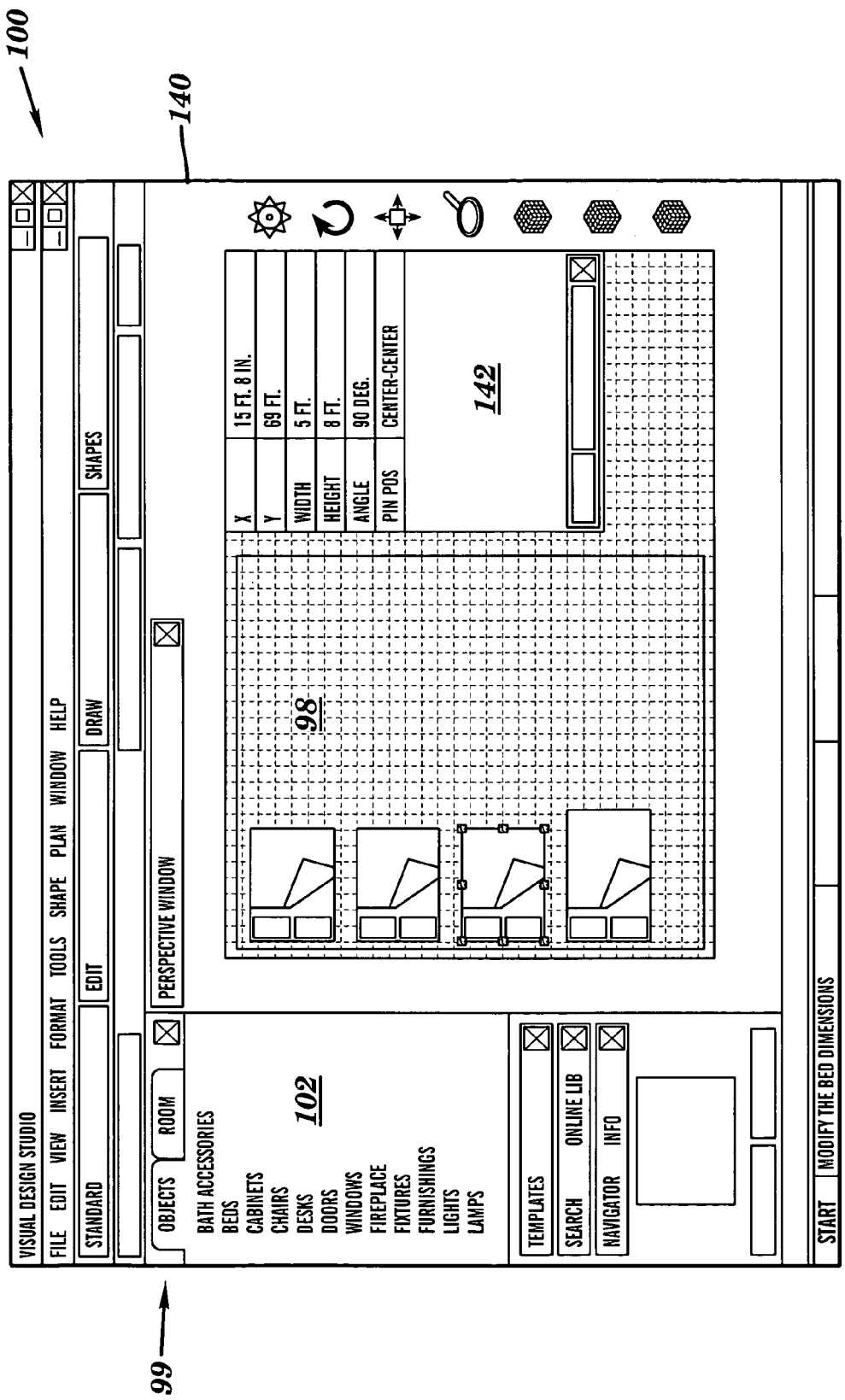
FIG. 6 is a screen display of exemplary operation of embodiments of the present invention.

Referring now to FIGS. 4 and 6, GUI 76 includes easy to use features and functionality. Intuitive "Hot Keys" may be provided for performing common tasks. For example pressing the "Ctrl+R" key may render the image. GUI 76 includes the Tasks Pane 99 from which tasks such as constructing a room, and selecting objects etc. may be performed. An intuitive Tool Pane 100 automatically modifies the displayed tools in response to the user's activities. For example, during the plan editing phase 116 (FIG. 5) a grid of 3D objects may be displayed on the right hand pane, such as shown in FIGS. 4 & 6. During the rendering options stage 122 (FIG. 5) the pane may change to display lighting and shadowing tools.

Template/Object Library

As discussed hereinabove, a repository of basic object types such as room design templates, basic furniture and fixtures, textures, and light equipment may be provided with application 12, in local library 42 (FIGS. 2, 5). This may allow the users the flexibility to pick the basic and popular items directly from the local template/object library.

As also discussed, application 12 may provide the ability to download additional objects (including room templates, textures) from the remote central repository 19 (FIG. 2). The downloaded objects may be stored within a predefined directory structure of the application on the user's hard disk, such as, for example EideticDesignObject>Application>Objects/Templates.

As discussed hereinabove, in particular embodiments, the objects may be stored in object libraries 19, 42 in the .sat file format having been converted thereto from .dxf, .dwg, Catia V4, Parasolid, Iges, or Step formats utilizing a suitable file converter, such as 3d InterOp Translators™ (Spatial Corp, Westminster, Col.), which may use OpenDWG™/DWGdirect libraries (OpenDWG™ Alliance, Phoenix, Ariz.) or ObjectDBX modules (Autodesk, Inc., San Rafael, Calif.).

In particular embodiments, the objects may be converted from the .sat format, to a reduced file-size format prior to their storage in repositories 19, 42 and/or use by application 12, 12'. Such a reduced-size or relatively compressed format, referred to herein as the DO (Design Object) or .edo file format, maybe configured to represent products, textures, etc., using comparatively smaller files than some other formats, to advantageously lessen the burden on system resources during the planning and rendering operations of application 12, 12'. In a particular exemplary embodiment, the .edo format files essentially include sat files represented in a binary, rather than text, format. As such, the .edo file is smaller in size than the .sat file, while containing nominally the same amount of information.

Moreover, in still further embodiments, a single object may be saved in library 19 (and/or library 14) as a consolidation of various files, e.g., *.edo, *.lwa, *.eoi and *.bmp, e.g., organized as:
  a. <Filename>.edo
  b. <<Filename>.edo>_Res folder
    i. Archive.1wa
    ii. Objectinfo.eoi
    iii. Preview32.bmp
    iv. Preview64.bmp
    v. Preview128.bmp The *.edo file contains the basic model geometry (3D information), and is a binary representation of the .sat file as discussed above. The Archive.lwa is a LightWorks™ Archive (LightWork Design Ltd, UK), which is used to store material and texture information. The Objectinfo.eoi is used to store various Object Information parameters. The Preview*.bmp files are used to store the preview images of the objects to be displayed application 12, 12'.

Once the objects are downloaded and used by application 12, 12', as discussed herein, the application may save them to local library 42 in a distinct format, such as an *.edr format. The EDR format is similar to the EDO format, in that it is essentially an SAT file represented in binary form, so that it advantageously is smaller in size than the SAT file. Moreover, the single EDR file may include a consolidation of various files, e.g., *.edr, *.lwa, *.roi organized as:
  a. <Filename>.edr
  b. <<Filename>.edr>_Res folder
    i. Archive.1wa
    ii. RoomInfo.roi The *.edr file contains the basic model geometry (3D information), in a binary representation of SAT. The Archive.lwa is an LightWorks Archive (LightWork Design Ltd, UK), used to store material and texture information. The RoomInfo.roi is used to store various room information parameters.

Room Planning

As discussed hereinabove, Room Planning 110 (FIG. 5) is logically a first step for users wishing to design and render a scene. The room planning may be accomplished in one of several ways including by import 112, manually creating 114, or submitting a service request to Development Center 20 (FIG. 1).

The user may import 112 from object library 42 (FIG. 2) by choosing one of several templates of room plans which may be further customized. Alternatively, the user may import an existing CAD drawing/plan of the room, such as provided by development center 20 via object repository 19. As a still further alternative, the user may begin planning 114 the room from scratch. This may be accomplished by allowing the user to enter the coordinates (x, y, z dimensions) of the room in a predefined room property window 142, as discussed hereinbelow with regard to FIG. 6.

A user request to Development Center 20 (FIG. 1) to draw the actual plan of the room, e.g., based on user-supplied room dimensions and photographs of the various surfaces, may be accomplished by configuring application 12 to automatically open the user's default email client.

The planning 110 of a room may be segregated into three tasks: a) floor plans; b) ceiling plans; and c) wall plans (elevations).

Users may either choose to custom design the plan of a room or use an intuitive wizard provided within application 12. A typical first step while using the wizard would be to select a "room type". This would enable the system to generate the default object library based on the "room type". For example, selecting a Kitchen would display objects such as cabinets, sinks, dishwashers etc.

In exemplary embodiments of the present invention, floor, ceiling, and wall (elevation) views may be generated by the steps of the following Tables 1-3. Planning 110 typically begins 114 with generation of two-dimensional (2D) views of the floor, ceiling, and walls, beginning with the floor view 140 (FIGS. 4 and 6), and following in a similar fashion with generation of the ceiling and wall views (FIG. 4).

TABLE 1

Floor Plan

Drawing and re-dimensioning of the floor either by dragging and dropping 112 templates using object menu 102, or by specifying the x, y and z co-ordinates 114 as shown in window 98 (FIG. 6), such as shown in parameter window 142.
Drawing and customizing the floor design by choosing 120 from an array of existing designs and textures from the library 42 such as stone based and wood based designs.
Positioning and re-positioning of objects such as furniture and appliances imported 120 from library 42.
Defining placeholders for other structures such as pillar and staircases on to the floor.

TABLE 2

Ceiling Plan

Drawing and re-dimensioning of the ceiling either by dragging and dropping templates 112 or by specifying 114 the x, y and z co-ordinates.
Defining the gradients/slopes and recesses by either importing a CAD drawing 112 or specifying 114 the co-ordinates and angles.
Positioning and re-positioning 120 of objects such as lights and fans imported from a library
Defining placeholders for other structures such as moldings, arches, beams and skylights on to the ceiling.
A set of ceiling objects may be stored in library 42 to allow users to choose from a number of pre-defined templates.

TABLE 3

Elevation (Wall Plan)

Specifying the number of walls for a room and planning one wall at a time.
Drawing and re-dimensioning of the walls either by dragging and dropping
templates 112 or by specifying 114 the x, y and z co-ordinates.
Defining, drawing and positioning of windows, doors, ventilators and AC space.

TABLE 3-continued

Elevation (Wall Plan)

Positioning and re-positioning 120 of objects such as lights and cupboards (fixtures) imported from a library.
Importing walls 112 either from an existing library or from a custom CAD drawing in case of curved walls.
Provisions may also be made to include scenarios where the walls are not at 90-degree angles to the floor or ceiling. A sloping option may be provided in the form of template/object libraries that would allow a user to drag and drop and wall into the drawing.

In addition to the foregoing, a number of rooms may have unique characteristics such as extensive carvings. In such an event, the user may wish to access the Service/Development center 20 as discussed hereinabove.

Planning 110 typically involves generation of floor, ceiling, and two elevations (e.g., side and front). From these views, application 12 may generate 118 a 3D wire frame view 94 (FIG. 4), using the coordinates provided therein, as will be discussed hereinbelow.

Embodiments of the present invention initially generate 2D views since such views tend to be easier for users. Also, such views tend to advantageously require less computational overhead (i.e., computer processing) than 3D views, to provide faster operation. It should be recognized, however, that 3D views may be generated prior to, or in lieu of, generation of 2D views, particularly as computer processing power/speed increases in the future, without departing from the spirit and scope of the present invention.

As shown in FIGS. 4 and 6, importation 120 and low level 3D (e.g., wireframe) imaging 118 of objects such as tables and chairs maybe provided during the planning phase. The objects 43 (FIG. 2) may be mapped onto the 2D or 3D views using placeholders visible in these views.

Application 12, 12' may provide "Snap and Glue" and "Collision Detection" functionality. This functionality applies predetermined constraints to objects to help prevent them from being placed at inappropriate locations in the scene. For example, these object constraints may permit a table lamp to be placed only on solid-surfaces such as a floor or table. A ceiling fan may be placed only upon a ceiling. Beds, Chairs etc., may be placed only on the floor.

Imaging 118, including rendering effects application 122, is typically accomplished using low level engine 72 (FIG. 3) uses the 2D drawings to generate 3D wire frames, such as shown in window 94 of FIG. 4. Higher level (e.g., photorealistic) rendering 126 may be accomplished once the planning phase is substantially complete, as will be discussed hereinbelow.

After generation 118 of the low resolution 3D view, the user may perform additional editing tasks 120 and rendering effects application 122. Many such tasks are included in Table 4 below.

TABLE 4

Image/Object Editing

Addition, deletion and modifications of objects within the room.
Redesigning, texturing, layering and coloring walls, floors and ceilings
Repositioning and re-dimensioning of objects. Optionally, the dimensions of all objects may be changed. If, however, the manufacturer does not offer the new dimensions of an object, a dialogue box may so inform the user. This allows for custom design of objects.
Changing textures and swatches of objects by selecting from wide range of options. If option so selected is not offered by manufacturer, a dialogue box may so inform the user.

Advanced Special Effects

Advanced editing tasks may also be effected to enhance the look and feel of the 3D objects by applying advanced lighting and shadow effects so as to render a photorealistic 3D feel.

Advantageously, this ability enables the aesthetics of the conceptualized design to be accurately communicated prior to build-out of the actual room(s).

This functionality may be provided by an Advanced Special Effects module which, depending on the particular rendering engines 72, 74 selected, may include some or all of the aspects of Table 5. Moreover, some of these special effects may be effected only in the high resolution 3D renderings 126, while others may be displayed in both high and low level renderings 126, 118.

Though the above features may be technically provided to the end users, the complexity of the technicalities may be abstracted from them by providing simple tools, such as actuated via tool bar 100 (FIG. 4) or automated in some instances. For example the user may simply drag-and-drop light equipment from object library 42, enter the luminosity (60 Watt, 120 Watt, etc.) adjust the angle of the light by rotating it, and the actual effects would be rendered in the 3D image.

High Level 3D Rendering

As mentioned above, once planning 110 and initial imagery 118, 120, and 122 is complete, application 12 may use high level rendering engine 74 (FIG. 3) to render 126 high quality 3D images. High level engine 74 may be used to

TABLE 5

Advanced Special Effects

Drag and drop of materials, lights and other visual elements onto the model using customizable drop zones
Libraries of predefined materials and light equipments for high quality point-and-click rendering;
Preview windows for interactive editing;
Multiple session views of the model or multiple models.
Predefined scenery objects for instantly placing models
Session archives for storing complete sessions or material and light studio archives.
Flat, Gouraud and Phong shaded rendering
Texture mapping
Anti-aliasing to smooth out the "jagged edges" in an image
Soft shadows
Multiple reflectance model shaders, including constant, matte, metallic and plastic
Transparent surfaces
Unlimited number of lights
Ability to join lights together in light groups for increased performance
Ambient, distant, eye, point and spot light sources
Customized light fall-off, for specifying the decreasing intensity of a light based on distance.
Solid and wrapped shader spaces
Chrome 2D reflectance
Bump map displacements from image files
Tread plate pattern
Environment-mapped backgrounds
Patches and patch meshes: bi-linear, bi-cubic, Bezier, B-spline/NURBS with trimming curves
Enhanced analytical anti-aliasing, providing developers with the best quality in anti-aliasing, while using minimal processing time and resources.
Implicit surfaces: sphere, cylinder, cone, torus, disk and paraboloid
Automatic surface connectivity
Highly realistic simulation of a wide range of wood surfaces, for ease of visualizing furniture, doors, cabinets, and even parquets floors.
Glass and mirror reflectance
Shadows cast by semi-transparent objects
Ray cast shadows
Hybrid shadow creation, combining ray tracing and scan-line rendering for fast, efficient production of ray-traced shadows.
Environment mapping (e.g., reflection mapping)
Radiosity module, for progressive, adaptive radiosity lighting simulations
Hybrid rendering, for integrating radiosity with ray-tracing and other rendering methods in a single image or animation
Volumetric lighting effects
Perceptual tone mapping, for physically accurate re-creations of the eye's response to brightness levels.
Field rendering
Motion blur
Translucent surface shaders
Anisotropic reflectance shader for woven materials, to produce physically based simulations of the anisotropic reflectance properties of woven textiles and materials, such as satin.
Global lighting effects
Expanded physically accurate lighting range allowing users to define accurate light beam shapes (such as fluorescent lights) using manufacturer's lighting data. Users can create precise lighting conditions with one click.
Ability to save radiosity solutions generate higher resolution, photorealistic images, such as shown in window 96 (FIG. 4).

Once satisfied with the design and scenic aesthetics of the objects, the user may optionally use high level rendering engine 74 to render a VRM (Virtually Real Model) image. The user may have the ability to define a series of camera click-points on the 3D scene depending upon desired viewing angles. Once defined, the user may be able to render a VRM output depicting a real time walkthrough displaying a room from various angles.

The VRM output 128 can be stored on the hard disk and later displayed using any suitable viewer 58 (FIG. 5).

In addition to the VRM image the user may have options to either directly display the 3D scene on display 58, which may include commercially available 3D/stereoscopic projection systems Virtual Reality projection systems 132 thus enhancing the overall viewing experience. Examples of suitable projection systems include the Vision Station™ 1024S, available from Lumens Corp. (http://www.elumens.com/), the TriDef™ 3D TV system available from ddd corp. (http://www.ddd.com/products/pro_main_frm.htm), and the ReaCTor Immersive Visualization Products from Trimension, a Division of SEOS, Co., Ltd. (www.trimension-inc.com)

Search

Application 12 may also include a search mechanism for searching through local object repository 42 using a wide range of search parameters. There may also be an option to extend the search to central repository 19 in the event a suitable match within the local repository 42 is not found.

The search may be broadly categorized as a 'Keyword Search' and 'Advanced Search'. In the Keyword Search, users are permitted to search the local object repository 42 on the basis of keywords. This search may bring up all the results that match the keywords searched for in the form of a structured thumbnail view of the objects. In the Advanced Search, users may select the manufacturers, products, and/or price range from a multi-select list box. Based on the selected parameters all the results that match the query may be displayed to the user. The user may optionally search the remote server 19, using either the Keyword or Advanced Search functionalities, by logging into a communications interface integrated into application 12 (as discussed hereinbelow), and entering the desired search parameters.

Product Ordering Functionality

Optionally, application 12 may be provided with various additional functionalities. For example, each object in libraries 19, 42 may be associated with a set of unique properties pre-defined by the manufacturer or by Development Center 20. Examples of these properties include cost information, dimensions, weight, color, discount options, availability, model number, order information, and shipment time, etc. The category under which the object falls may also be included, such as Object—Victorian Chair, Manufactured By—Manufacturer X, and Category—Furniture. The cost information may be used by application 12 to automatically calculate the total costs associated with a particular project (e.g., room improvement). Alternatively, the user may choose to view the properties of each object individually, such as to calculate the cost of individual items. For example, it may be possible to calculate the cost of painting a room based on the surface area, using different types of emulsions provided by different manufacturers.

The ordering/purchasing information may enable application 12 to nominally accurately map the displayed objects to the real world, to generate a true WYSIWYG (What You See Is What You Get) effect. Application 12 may provide complete information, but leave the commercial transactions to the manufacturer and the user or property owner. Alternatively, application 12 may enable a user to order products simply by transmitting the order information of selected objects directly to the manufacturers thereof or to provide such ability to the interior designer. The maximum shipment time may be used to provide the user or property owner with a reasonable idea of the time needed to complete a particular project.

Communication Interface

A separate mini-application may be bundled with the main application 12, which may act as a real-time communication bridge between the main application 12 (and the user 14), and the central repository 19 (and development center 20). This communication interface may load at startup and may be visible to the user as a small icon in the system tray of his computer. This interface may require the user to login to the central object repository through an interface and upon successful authentication from the server may proceed to use the services provided by the central repository. Alternatively, the user may opt to enter a username and password the first time and provided he/she has selected the option to log the user automatically from the machine, he/she may not have to enter the login information subsequently.

The interface may poll to determine whether the user is connected to the Internet and in such a case may flash important news and information available at the central repository on the user's screen.

The interface may connect to the online object repository on demand and allow the users to search for the objects available in the online library. It may download the objects selected by the user to the user's hard disk and may intelligently store the objects within the defined classification/hierarchy of object tree similar to that of the online object repository.

The communications interface may also automatically synchronize the existing objects available in the online repository with the objects stored on the individual users' hard disk to ensure that there is no ambiguity. If a particular manufacturer's object has been removed from the online repository, then the user maybe informed of such an event and prompted to delete the object if stored within the local repository of the user.

This application may also automatically download fixes and minor updates for the application from the server and execute it. It would have a "resume" option for broken downloads.

Messages from the administrator may be multicast on selected or all registered users reminding of their subscription fee dues.

Object Libraries

Local object library 42 may reside in a desktop version of MS Access™ 2000 (Microsoft® Corporation), which may be bundled with application 12 as a data store. Alternatively, this library may reside within other commonly available data engines such as Jet™ or MSDE™, which are available from Microsoft® Corporation.

Remote object library 19 may reside in an MS SQL™ Server 2000 (Microsoft®) or Oracle® 8i (Oracle Corporation). As discussed hereinabove, library 19 may store all of the 3D Objects uploaded by either the manufacturer or by Development Center 20. This library 19 and it's server may be integrated with the Communications Interface described hereinbelow.

Download Module

A download module may be provided to facilitate access to library 19 and development center 20 (FIG. 2) by various users. Specific features are included in the following Table 6.

TABLE 6

| Download Module |
| --- |
| Different types of users based on their profiles and access permissions may be able to directly upload and download 3D objects to and from the object library 19. |
| The upload facility may be available only to the manufacturers and selected object developers. |
| The download facility may be available to the users. |
| Upload and download may typically happen from the central repository 19 upon proper authentication. |
| Manufacturers may upload 3D Objects in accordance with agreed upon terms and conditions. |
| The download may be effected by: |
| Clicking on an image (e.g., .gifimage) representing the object visible on a download preview screen. |

TABLE 6-continued

| Download Module |
| --- |
| Directly selecting the object and dragging and dropping it on the hard disk or a window of application 12. |

Website

Optionally, server 18 may include, or be linked to a website to serve as a support, marketing and advertising platform for application 12. The website may not only enhance and streamline the business process but also may provide a common platform for the users and manufacturers to login and transparently interact with one another. The aforementioned processes such as uploading of objects by the manufacturers, updates on news/information related to interior design and product support can be automated thus saving considerable time and effort by Interior Designers, Manufacturers, and Development Center 20. The website may include one or more of the features set forth in the following Table 7.

TABLE 7

| Website |
| --- |
| A Flash Demo may be included to allow a user to see how the site works as well as act as a tutorial for the use the system. |
| A registration module may be provided to enable new users to apply for registration on the site. |
| While registering, users may also be given the option to subscribe to a website newsletter. |
| Upon approval by the Site Administrator, the applicant may be able to use the User Name and Password provided by the Administrator to access the Upload/Download section. |
| Approval for the user to register on the site may be sent by email as provided by the user during registration. |
| The email may contain the Username and temporary Password provided by the Administrator. |
| Following a successful registration, users may also be able to edit their registration details. |
| Various Registration Levels, based on subscription fees, may be provided to enable manufacturers to restrict access to CAD drawings of their products to only serious buyers. The following solution aims to take care of this. |
| Personalized sections may be provided for distinct types of users, e.g., manufacturers and Interior Designers. |
|    Manufacturers may be able to perform the following tasks within their personalized section: |
|       They may be able to set alerts for news flashes, information and updates. |
|       They may be able to browse through their own object library |
|       They may be able to upload new 3D objects to the repository within their own library |
|       They may be able to delete an existing object from their library |
|       They may be able to view the current preference trend patterns of the Interior Designers. This may allow them to focus on products as preferred by the Interior Designers. |
|       They may be able to post information about the new objects they are offering and this may be visible to the Interior Designers as flashes. |
|       They may be able to browse the general news and information section of the site. |
|       They can query or respond to one or more Interior Designers |
|       They can also see the custom messages posted to them by the Site Administrator. |
|       They may be able to contact the Site Administrator using the Contact Section of the site typically by filling in the query/request in a form. |
|    Interior Designers may be able to perform the following tasks within their personalized section: |
|       They may be able to set alerts for news flashes, information and updates. |
|       They may be able to set preferences for their own preferred manufacturers. Once set, the preferred list may be displayed on their home page. |
|       They may be able to browse through all the manufacturers object libraries. |
|       They may be able to download existing 3D objects from the online repository to their hard disks either by dragging and dropping the image or by using the default download mechanism provided by the browser. |
|       They may be able to download the trial version of the product and upgrade it to the full registered version upon realization of payment by MPD by logging |

TABLE 7-continued

Website on to the site and generating the license key.
They may be able to download the Word/PDF file describing the features and
functionality of the product in detail.
They may be able to query and respond to one, many or all the manufacturers.
They can also see the custom messages posted to them by the Site
Administrator.
They may be able to contact the Site Administrator using the Contact Section
of the site typically by filling in their query/request in a form.
A Site Search Engine may be provided.
  Keyword Search —A site search may be enabled that may allow users to search the
  site on the basis of keywords. The search may index the text of all the pages and
  bring up all the results that match the keywords searched for.
  Advanced Search —The users may use this option by selecting the Manufactures,
  products and price range from a multi-select list box provided in the website. Based
  on the selected parameters all the results that match the query may be displayed to
  the user.
A Product Preview Section may enable a trial version of the application 12 to be downloaded
to registered users.
A news section on the site may enable site users to browse through Interior Designing related
news and information.
The site administrator may be able to manage the news and information section through a News &
Information Management System
A Help and FAQ section may be provided to educate the user and provide the necessary
information which may enable the user to effectively use the website. It may be managed via the
Administration Section of the website.
A Contact Us Section enables users to contact an official at center 20 based on parameters
such as:
  Products & services.
  Special Requests
  Resolution of issues.
An administration panel may be a collection of the features detailed above and may mainly
comprise the following:
  News and Information management
  Content Management for Help and FAQ section
  User Management for approval/denial of new user registration or deletion of existing
  users based on the credential check conducted by the website administrator.
  Subscription monitoring and management: An interface may be provided to the
  administrator to monitor and manage the subscription such as status of payments,
  subscription renewal, tracking of late payments etc.
  Object Library management for deleting objects from the library (in case the object is
  not relevant to the site or the information provided is incomplete)
  Alerts and Mail management for sending Individual or Bulk mails to the users.

Further optional features of the present invention include an intelligent matching and replacing (Search and Replace) engine provided within application 12 which may search for similar make and type of objects and replace the existing design with the new objects and also summarize the cost comparison of both the scenes. For example, if the total cost of refurbishing a house comes to $75,000.00 and the client asks the Interior Designer to design a second model of the room with almost similar objects without displacing the placement of objects and lights within the room, which would cost him $60,000.00. In such a case the user may simply insert the desired total cost of refurbishing the room and the application would then internally look for matching objects within the local object repository 42 and in the centralized object repository 19 and redraw and render the entire room automatically. This would desirably be accomplished within a preview stage and may subsequently effect an actual replace if confirmed by the user.

Although the various features and functions of embodiments of the present invention have been shown and described with respect to Microsoft® computing platforms, the skilled artisan should recognize that alternate embodiments may similarly operate on an Apple Macintosh® (Apple Corporation, Cupertino, Calif.), without departing from the spirit and scope of the present invention. Turning now to Tables 8-19, various functionalities that may be effected using a specific embodiment of GUI 76 are indicated.

TABLE 8

File Options

Process
Create New Room
Input
Menu item File-New-Blank Room
Output
Blank Document in work area
Description
Use to create a blank new document TABLE 8-continued

| File Options |
|---|

Process
Create new model from Wizard
Input
Menu item File-New-From Wizard
Output
A new document based on selected template in the wizard
Description
User would use this option to create a room of specified size and shape. Normally a non-rectangular room.
Process
Open existing model
Input
Menu item File-Open
Output
3D model of the room displayed in the Work area.
Description
User would use this option to open existing models and would be used for further manipulation
Process
Save Model
Input
Menu item File-Save
Output
A Document saved on the hard disk at the specified location
Description
User would use this option to save the currently opened model to the specified location in the hard disk.
Process
Save model as Jpeg Image
Input
Menu item File-Save as [File type: - Jpeg Image (*.jpg)]
Output
A Jpeg Image Document on the hard disk at specified location
Description
User would use this option to save the current scene to 2D Jpeg Image.
Process
Save model as Windows Bitmap
Input
Menu item File-save as [File type: - Windows Bitmap (*.bmp)]
Output
A Bmp Document saved on the hard disk at the specified location
Description
User would use this option to save the current scene to a 2D 24bit color depth windows bitmap image
Process
Save model as DXF Document
Input
Menu item File-Save as [File type: - Drawing exchange format (*.dxf)]
Output
A DXF document saved on the hard disk at the specified location
Description
User would use this option to save the current scene to DXF file, please note that textures applied to the current scene would not be saved in this DXF.
Process
Print Room model
Input
Menu item File-Print
Output
2D image on the printer
Description
Allows user to print 2D Image of the Current scene (could be a wire frame or a fully rendered room)
Process
Print preview of the model
Input
Menu item File-Print preview
Output
Preview on the screen
Description
Allows User to get a feel of how the active model would look when printed using specified page settings
Process
Page setup
Input
Menu item File-Page setup
Output
Paper settings stored internally

TABLE 8-continued

File Options

Description
Allows User to specify the page settings like orientation/size/margins etc.
Process
Edit File properties
Input
Menu item File-Properties
Output
A Window displaying the various properties
Description
This feature would allow user to edit the document properties like Author of the document, Organization, Subject etc.
Process
Import 3D objects into VDS Objects repository
Input
Menu item File-Import-Object
Output
A new listing appearing the VDS Object browser's objects listing
Description
User would use this option to import the outside objects into VDS Objects repository, basically if a user has his/her own 3D models (other than what are shipped with the document and the ones delivered from the Online repository) and she/he wishes these models to be listed in the VDS Object browser, the user would then require to use this option.
Process
Import textures into VDS Textures repository
Input
Menu item File-Import-Textures
Output
A new listing appearing in the VDS Object browser's Textures listing
Description
User would use this option to import his/her own textures into VDS Textures repository
Process
Send VDS document via email
Input
Menu item File-Send via email
Output
Default mail client opening with the Zipped document as attachment
Description
User might want to send the currently opened document via email. This task can be accomplished merely by a click alternatively user has to open a mail application, browse for
the document and then attaching it, also s(he) would require to attach all the relative documents (like textures) also, but with the help of this option user would simply click one menu item and all the other related document would get zipped together with the model and this single document would appear as an attachment.

TABLE 9

Selection modes

| | |
|---|---|
| Process | Setting selection mode to select complete objects |
| Input | Menu item Selection mode-Complete objects |
| Output | No Visual output on the screen, selection mode changed to complete objects |
| Description | If user wants to move a object lets say a chair to a different position she/he would require to select the complete object rather than subparts like handle/legs etc. So in this case user would set the selection mode to Complete objects and there after whenever user clicks in the model the complete object would get selected instead of subcomponents of that object |
| Process | Setting selection mode to Sub parts |
| Input | Menu item Selection mode-Sub parts |
| Output | No Visual output on the screen, selection mode changed to Sub parts |
| Description | This option would be used in cases where user wants to change properties of sub components for ex if user wants to apply a texture on the handle of a chair, she/he would have to select the handle first, but if the Complete object mode is on then user would not be able to select the handle. In this case she/he would set the mode to Sub parts and would then click on Handle to select the handle |

TABLE 10

Scaling Features

| | |
|---|---|
| Process | Scale the complete drawing to fit the Work area |
| Input | Menu item View-Auto scale |
| Output | Model Scaled to fit the work area |
| Description | User would this option in case when s(he) wants to view the complete model without any need to scroll. Could also be used in case when model is displayed in too small of size and user wants to see in bigger size but not bigger than work area. |
| Process | Scale a Object or a Subpart to fit the work area |
| Input | Menu item View-Auto scale selection |
| Output | Selected object or subpart being scaled to fit the work area |
| Description | User might want to see some object of the room to be enlarged/scaled down in order to fit the work area. In this case user would require selecting that object and then would choose this menu option in order to see that selected object fitted in work area. |
| Process | Scaling the scene to Half of current dimensions |
| Input | Menu item View-Half scale |
| Output | Scene scaled down to exactly half of its current dimensions |
| Description | Yet another scaling feature using which a user can easily scale down the scene to exactly half |

TABLE 10-continued

Scaling Features

| | |
|---|---|
| Process | Zoom in the scene by desired factor |
| Input | Menu item View-Zoom in |
| Output | Cursor would change to a zoom lens cursor |
| Description | User would select this tool and then select a particular rectangular area, which she/he desired to view on a bigger scale. Moment the mouse is released the selected rectangular area would be zoomed to fit the work area. |

TABLE 11

Viewing Options

| | |
|---|---|
| Process | Setting view point |
| Input | Menu item View-View point, and then selecting the View direction from a specific position |
| Output | Current view would change to plan view, Mouse icon would change to a Eye ball icon, Perspective window would open displaying the semi rendered room. |
| Description | Allows the user to look at the room from a specific position and in the specified direction. |
| Process | View the wire frame structure of the room |
| Input | Menu item View-Wire frame |
| Output | Wire frame model of the room displayed in the work area |
| Description | Allows the user to view the wire frame structure of the room and the objects placed in it. |
| Process | View the semi rendered scene of the room |
| Input | Menu item View-Semi rendered |
| Output | Current view of the room would change to semi rendered |
| Process | Highest quality rendering |
| Input | Menu item View-Render |
| Output | Highest quality rendering with all the light effects etc displayed in work area. |
| Description | Allows user to view the model in a realistic form with all the light effects. Menus would change since there would be very few editing options available to the user in a highly rendered model. |
| Process | Split the work area into four views each displaying different aspect of the room |
| Input | Menu item View-Split |
| Output | Work area would split into four views |
| Description | Allows user to view the room from four different elevations Front view, Side view, Plan view and the current view. |

TABLE 12

Tools

| | |
|---|---|
| Process | Producing Bill of material |
| Input | Menu item Tools-Bill of material |
| Output | Floating window displaying the properties of all the objects placed in the room |
| Description | Allows the user to see a consolidated report about the objects placed in the room. This would also help the user to calculate the cost required to build such a room. |
| Process | Editing the scene properties |
| Input | Menu item Tools-Scene properties |
| Output | A pop window displaying the various properties of the scene |
| Description | Allows user to edit the various properties of the current scene, properties like geographical location. Time of the day etc. |
| Process | Poll for objects in Online repository |
| Input | Menu item Tools-Synchronize objects |
| Output | Floating window would appear, displaying the status of receiving objects from online repository. |
| Description | Allows user to download new objects available in Online repository and synchronize the properties of existing objects on the user's desktop. |
| Process | Customizing the placement/order of toolbars and the buttons appearing in the toolbar |
| Input | Menu item Tools-Customize |
| Output | A Popup window displaying the set of available toolbars |
| Description | Allows user to Customize the placement of all the Available toolbars and adding/removing of buttons in those toolbars |

TABLE 13

Editing Options

| | |
|---|---|
| Process | Conventional Editing features such as Undo Cut, Copy, Paste, Delete, Select all |
| Input | Menu item Edit-Undo/Cut/Copy/Paste/Delete/Select all |
| Output | Respective standard outputs |
| Description | Undo: Undo the last action. |
| | Cut: Cut deletes the object from scene and copies it on the clipboard. |
| | Copy: Copies the selected object onto clipboard. |
| | Paste: Pastes an object in to the room from Clipboard. |
| | Delete: Simply deletes the selected object. |
| | Select all: Selects the complete model. |
| Process | Move or rotate the selected object by an offset/angle |
| Input | Menu item Edit-Translate |
| Output | A floating window asking for the Offset/angle |
| Description | Allows user to move selected object by an offset or rotate the selected object by an angle. |
| Process | Make multiple copies of the object |
| Input | Menu item Edit-Duplicate |
| Output | A floating window asking for the number of copies and in the direction in which the copies would be duplicated. |
| Description | Allows user to make specified number of duplicate copies just by specifying the number of copies. |
| Process | Editing the properties of selected object |
| Input | Menu item Edit-Properties |
| Output | A floating window displaying the properties of selected object. |
| Description | Allows user to edit the properties of selected object. |

TABLE 14

Search

| | |
|---|---|
| Process | Search for objects in online repository and in local folder. |
| Input | Menu item Edit-Search |
| Output | Search tab in Object browser becomes active. |
| Description | Allows user to search for objects in online repository and in the local folder. User can specify many search criteria like Search by manufacture, search by category etc. |

TABLE 15

Scroll

| | |
|---|---|
| Process | Scroll into the non-visible area of the room |
| Input | Mouse click in Navigator |
| Output | Work area scrolls to desired location |
| Description | Allows user to scroll the work area to the desired area of the room. Navigator's interface is easier and more intuitive than conventional scroller. |

TABLE 16

Modeling Options

| | |
|---|---|
| Process | Add object from library |
| Input | Select object from library, drag them and drop into the working area at the desired position. |
| Output | Object is inserted into the room |
| Description | Allows user to place desired objects in the room at desired positions. Further manipulation like moving the object can be accomplished by other relative tools. |
| Process | Replace selected object with some other object |
| Input | Select the object to be replaced, menu item Object-Replace object, select the new object from Object library. |
| Output | Selected object would be replaced by the newly selected object from the object library |
| Description | This feature is extremely useful in cases when user wants to place a new object in place of existing placed object or otherwise has to perform all the steps, which were performed earlier to place the object correctly. |
| Process | Group a selection of objects. |
| Input | User selects multiple object by clicking them, with SHIFT key pressed down, and then selects Group option |
| Output | The objects are grouped logically. |
| Description | User can define multiple objects as a group, to be manipulated together. There after if the user clicks on any of these objects, all the objects would be selected. |
| Process | Ungroup an already grouped objects |
| Input | User selects the object to ungroup, and then selects the Ungroup option. |
| Output | All objects inside the group would be ungrouped |
| Description | |

TABLE 17

Drawing tools

Process
Draw straight wall
Input
Menu item Draw-Straight wall, a Mouse down in the work area, and dragged to another point in the work area.
Output
A Wall joining start and end point.
Description
Allows user to draw straight walls, wall drawn this way would be created with the default height (specified in Options). User can change the height of wall by editing the properties of wall.
Process
Draw Curved wall
Input
Menu item Draw-Curved wall may enable the curved wall drawing tool.
Output
A curved wall of the specified radius and height.
Description
To draw the wall, user may initially create a straight wall by dragging the mouse from wall start point to the wall end point. After this step, another mouse drag perpendicular to the line may provide the desired curvature to the wall, keeping the endpoints fixed.
Process
Snip Wall segment
Input
Menu Item Snip wall
Output
Put the application in wall - snip mode.
Description
To delete the undesired wall segment, user can select the undesired segment using the snip tool, to remove them.
Process
Move Wall
Input
Menu Item Move/Context Menu/Wall Select
Output
Repositioned wall resulting in a resized room
Description
User may select the wall in a move mode, and drag it to the new position, which would cause all connected walls to reposition accordingly, thereby giving rise to new wall geometry.
Process
Delete Wall
Input
Menu Delete wall/Context menu/Delete key
Output
The selected wall is deleted
Description
To remove the wall, user can select the wall and delete it.
Process
Resize Wall
Input
Menu item Resize Wall/Context Menu/Select + Drag
Output
The selected wall is resized to a new dimension
Description
To resize a wall, user can start dragging the wall inwards or outwards from end points of the wall to increase/decrease its length. All connected walls may adjust accordingly.

TABLE 18

Options

Process
Search Directories
Input
Directory Path Names
Output
-NA-
Description
The Library files are stored/retrieved from the specified directories.
Process
Synchronization Frequency
Input
The time for polling
Output
-NA-

TABLE 18-continued

Options

Description
The application polls the server to check for new file definitions at the specified time
interval.
Process
Default wall dimensions
Input
Wall height and width
Output
-NA-
Description
New walls are created with the specified dimensions.
Process
Dimension units
Input
The units for dimensions
Output
-NA-
Description
The unit of measurement are defines as m, ft, m etc.
Process
Default View
Input
A view name
Output
-NA-
Description
The application opens with the specified view as the main view. The vies might be one of:
Front, Side, Plan, 3D view
Process
Wall Hatching
Input
Hatching style
Output
-NA-
Description
The default wall hatching style is specified.
Process
Dimension style
Input
Dimension font details
Output
-NA-
Description
Dimensions are created using the specified font.

TABLE 19

Lights

Lights are treated in a similar manner to that of an object, distinguished by the fact that they would be accompanied by their luminous properties, which other objects typically lack. The light objects are present in the "object browser" (left side pane). The user can browse through different manufacturers' lights, select a specific light model, and place it in the main working area of the browser window. The light properties would be listed in the properties dialog box, where the user may have the option to change/edit the controlling values, in order to adjust the light.

TABLE 20

Texture/Material

Textures can be applied to objects and their sub parts (e.g.: legs of chair have different texture and chair back has a different texture). Textures may be simply bitmap files (*.bmp). The textures bound to the specific subpart (defined by the manufacturer) may be listed in the properties dialog box, allowing the user to browse through a list of possible textures and select an appropriate one.
The choice of textures would vary from subpart to subpart. Any image (2D image) captured from a digital camera, or from a file, can also

TABLE 20-continued

Texture/Material be used as a texture.
Materials define an object's (or subpart's) physical properties like reflectance, opacity, specularity etc. Various combinations of these parameters define the objects tendency to interact with the surrounding light. Each subpart/object may have its own set of possible set of materials, which can be changed from the properties window in a manner similar to that of the textures.

An embodiment of the invention having been described, the following is an example of the operation thereof, described with reference to FIGS. 7-29.

Figure 7:
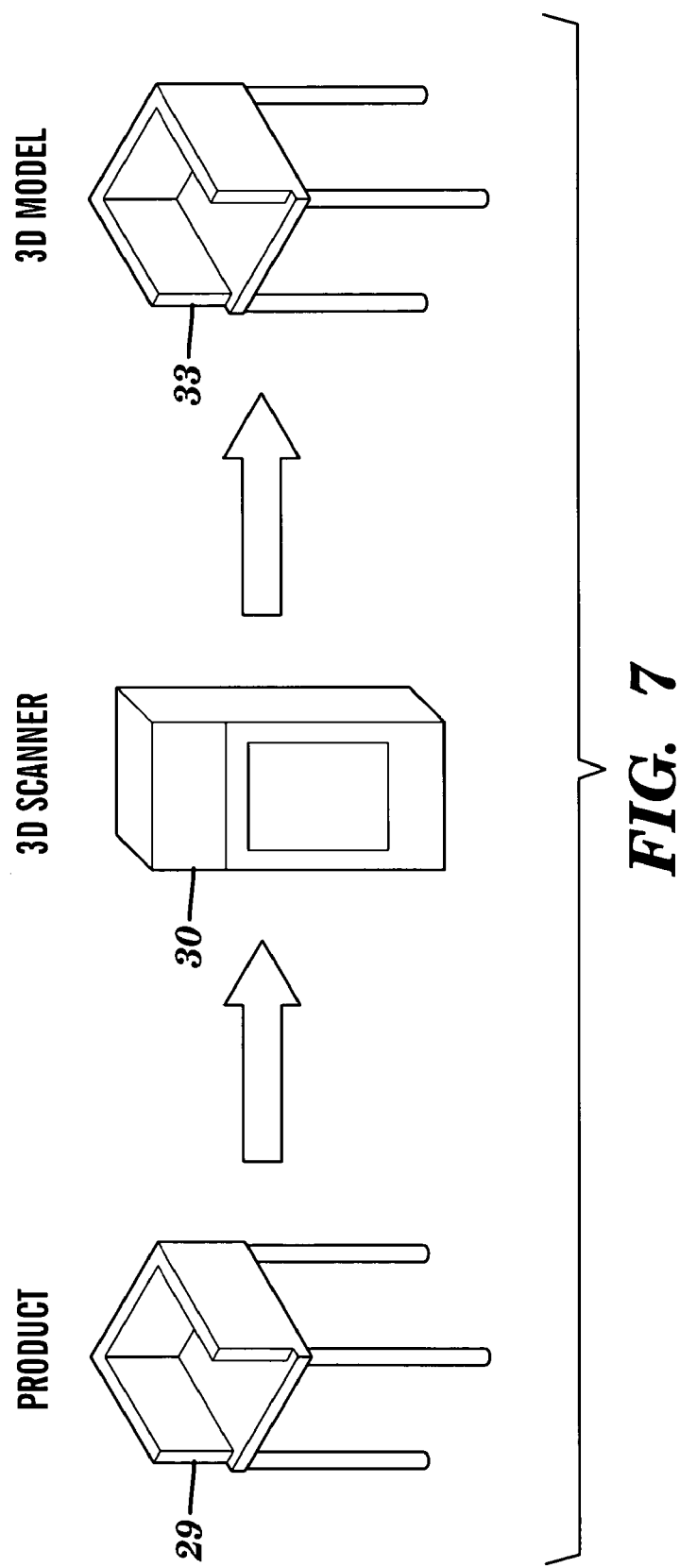
FIG. 7 is a perspective view of initial operation of embodiments of the present invention.
Figure 8:
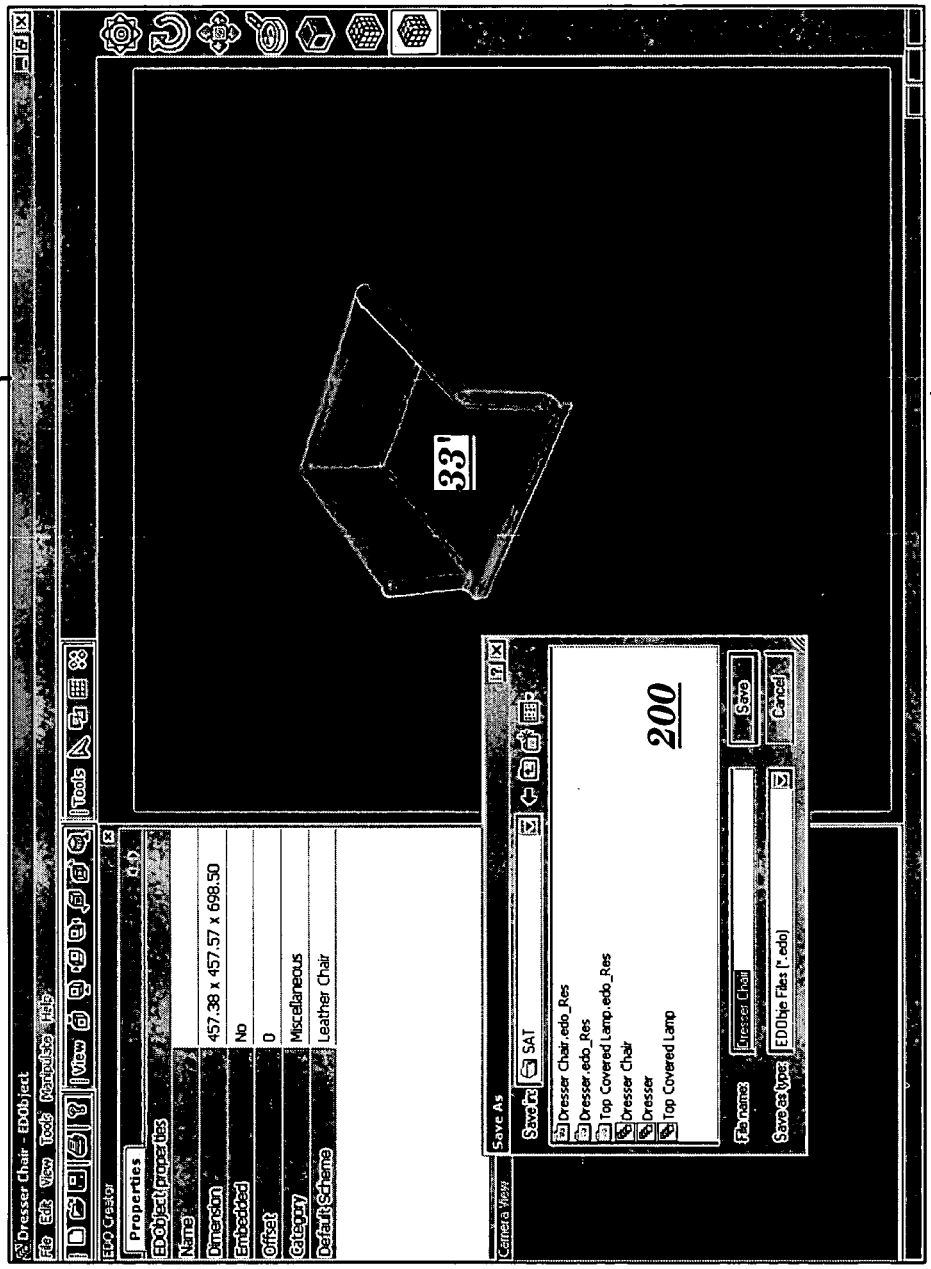
FIGS. 8-29 are screen displays of exemplary operation of an embodiment of the present invention.

Turning to FIG. 7, a furniture object (product) 29 is scanned by a 3D scanner 30 (FIG. 2), to generate a 3D object model 33 in the .DXF format. As shown in FIG. 8, development center 20, embodied as a Design Object (DO) converter application running on a developer's PC, then imports 3D model 33, e.g., as a wireframe using wireframe module 34, edits, applies material and texture using modules 36, 38 (FIG. 2), and generates a DO object 33' using module 40. Object 33' is then saved to library 19 (FIG. 2) in the DO format such as shown in dialog box 200. DO object 33' is now ready to be download by application 12, 12' and saved in database 42 as object 43 (FIG. 2).

Figure 9:
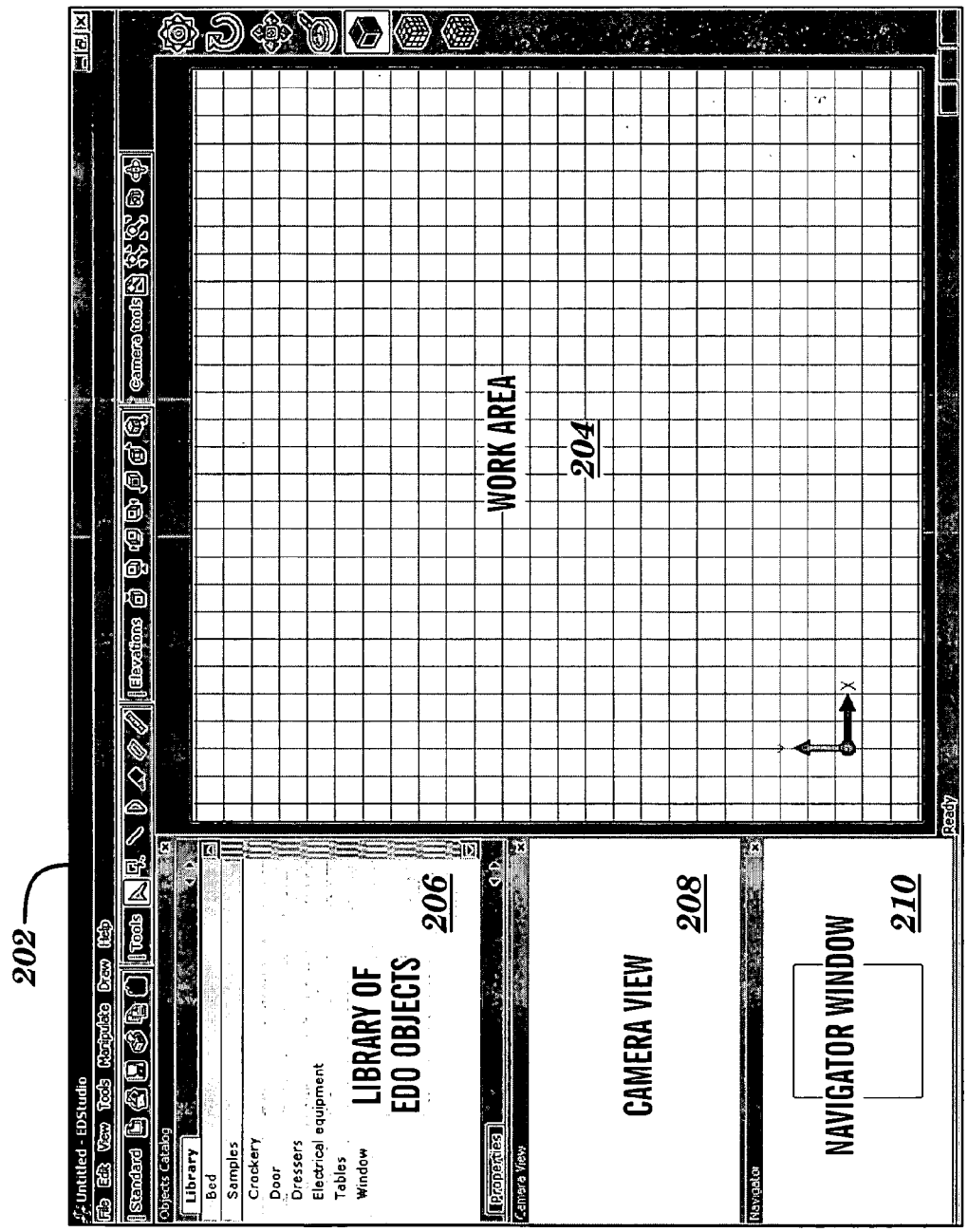
Figure 10:
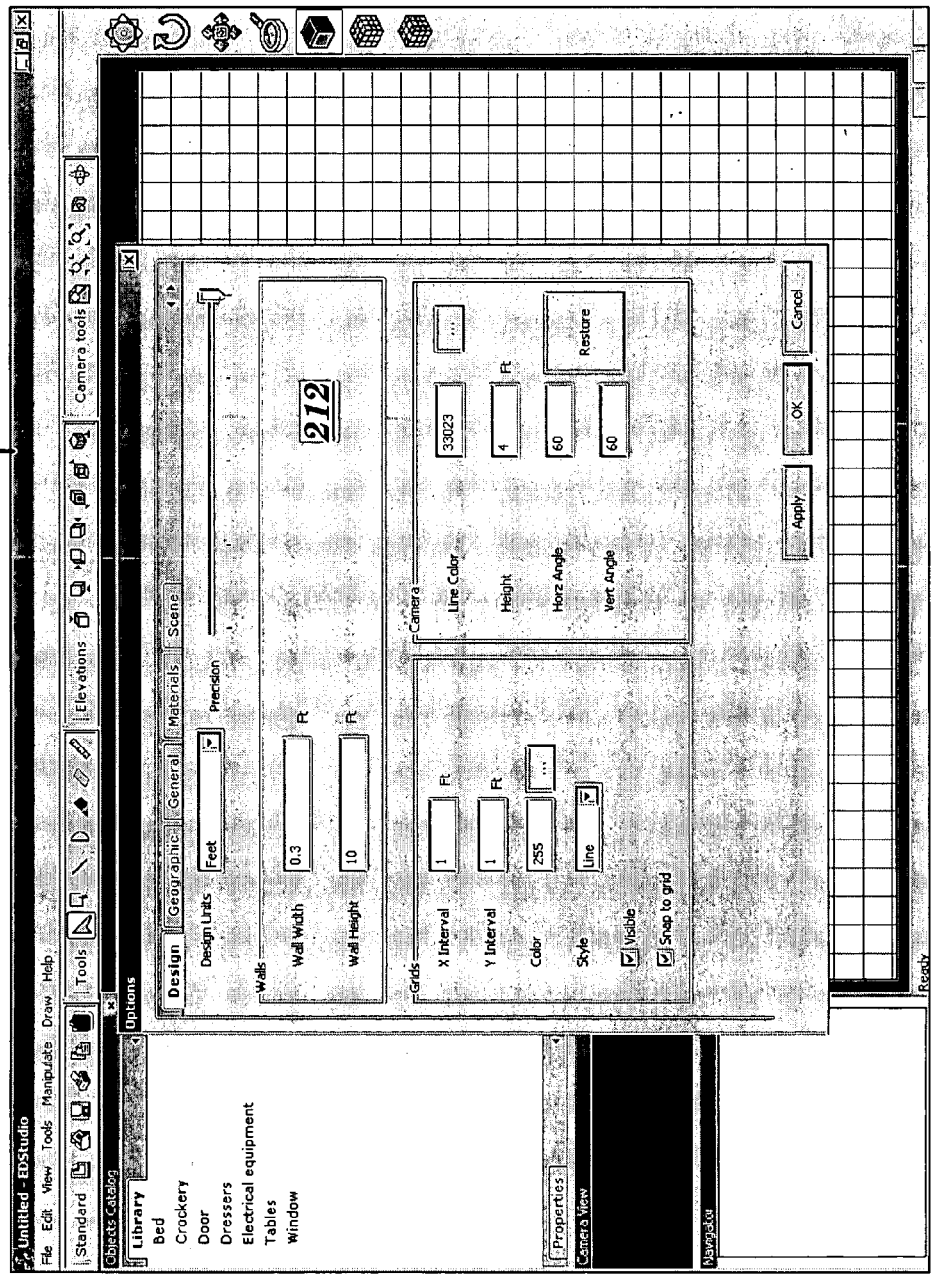
Figure 11:
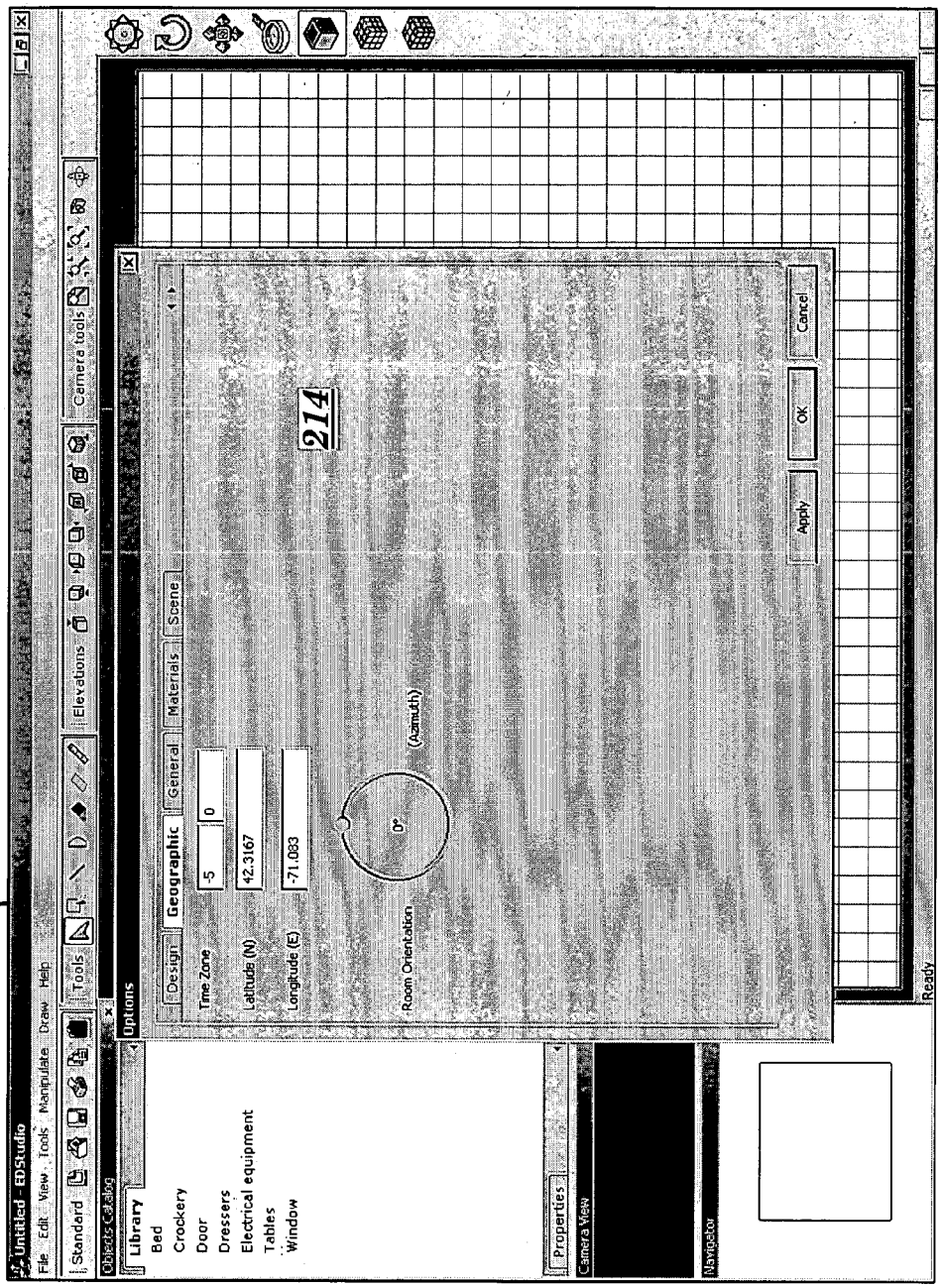

Turning now to FIG. 9, a user may open application 12, to a blank GUI screen 202, which includes a work area 204, library of objects 206, a camera view portion 208, and a navigator window 210. As shown in FIG. 10, design dialog 212 enables the user to specify such options as design units, wall width and height, grid size and color, camera coverage, and line color of the camera. Geographic dialog 214, shown in FIG. 11, enables the user to specify options such as time zone, longitude/latitude, and orientation of a room being configured.

Figure 12:
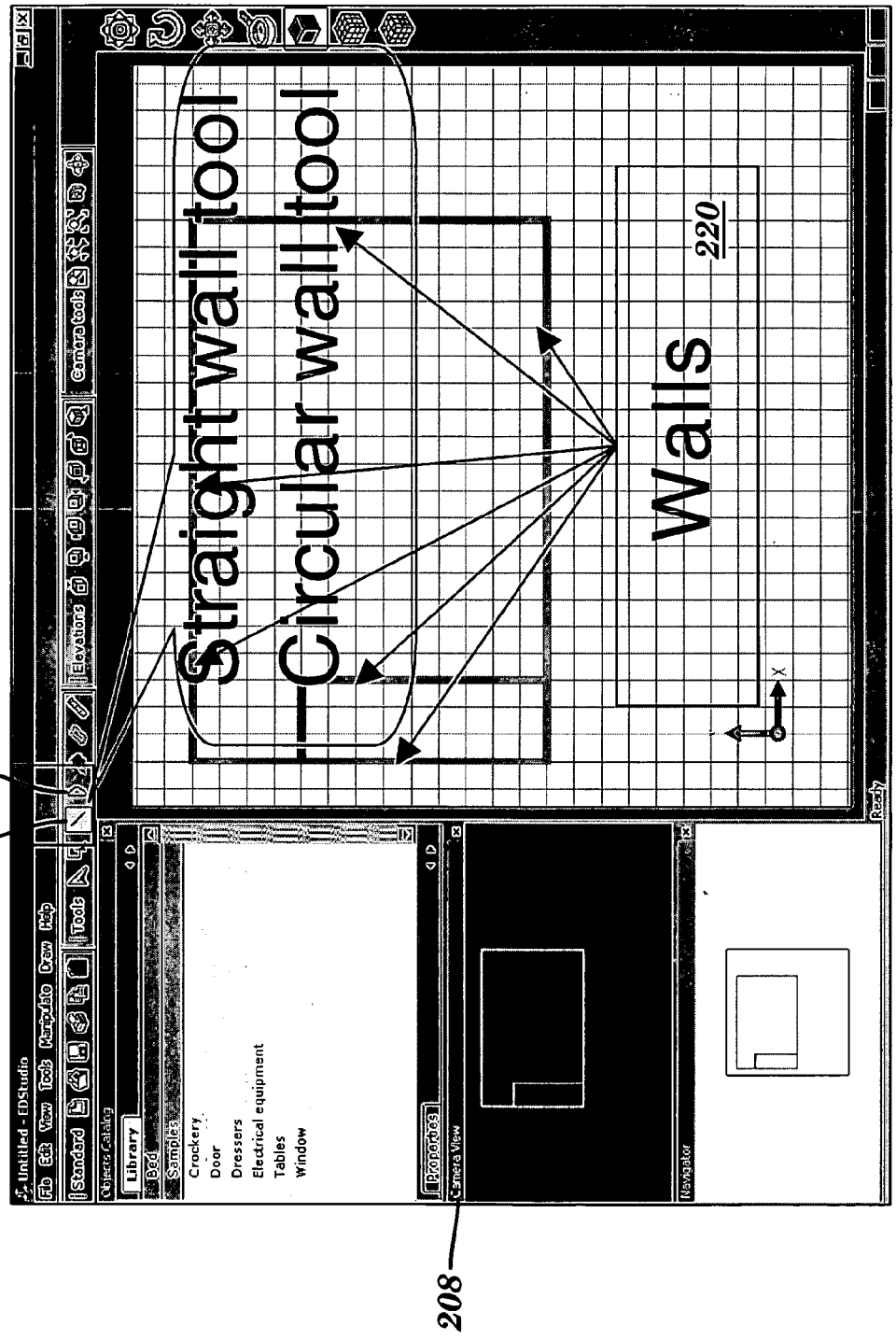

As shown in FIG. 12, the user begins creating a room using straight or circular wall tools 216, 218, respectively, to generate walls 220 (which are straight in the example shown) in work area 204. The length of each wall is displayed (not shown) as it is created. Default materials are applied to the walls after they are created, and camera view 208 is updated upon the creation/addition of a new entity (e.g., wall) or object in work area 204.

Figure 13:
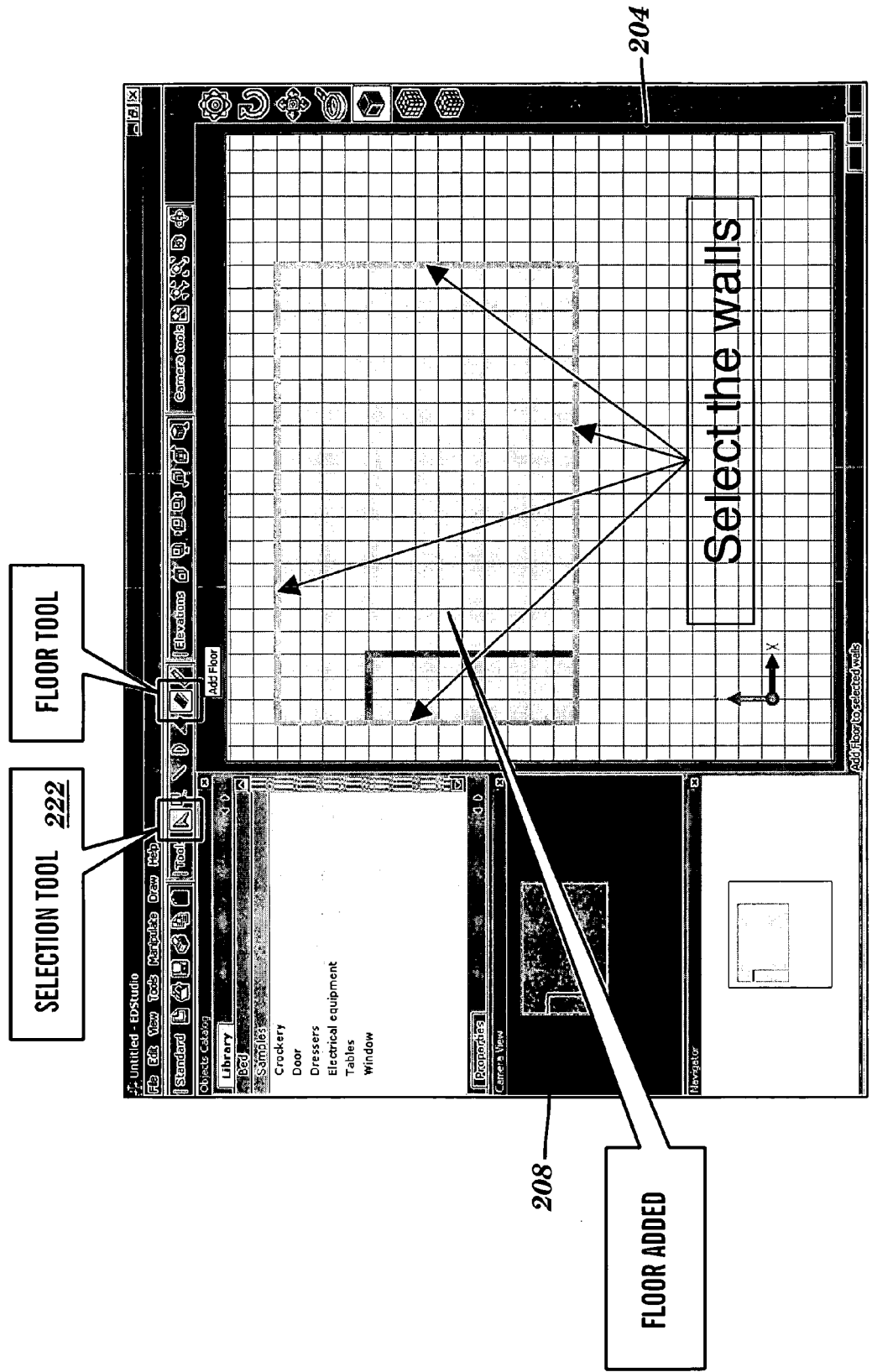
Figure 14:
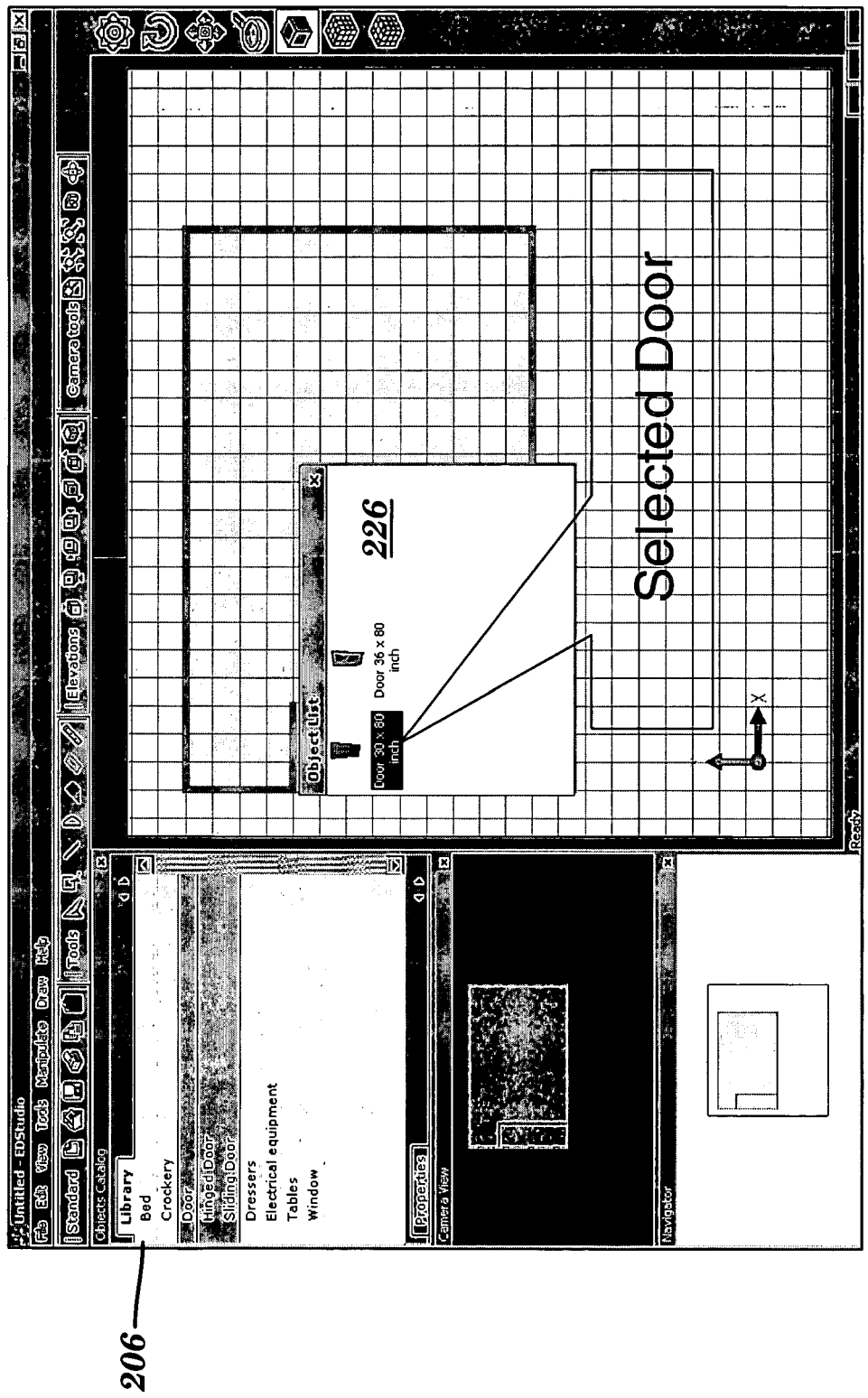
Figure 15:
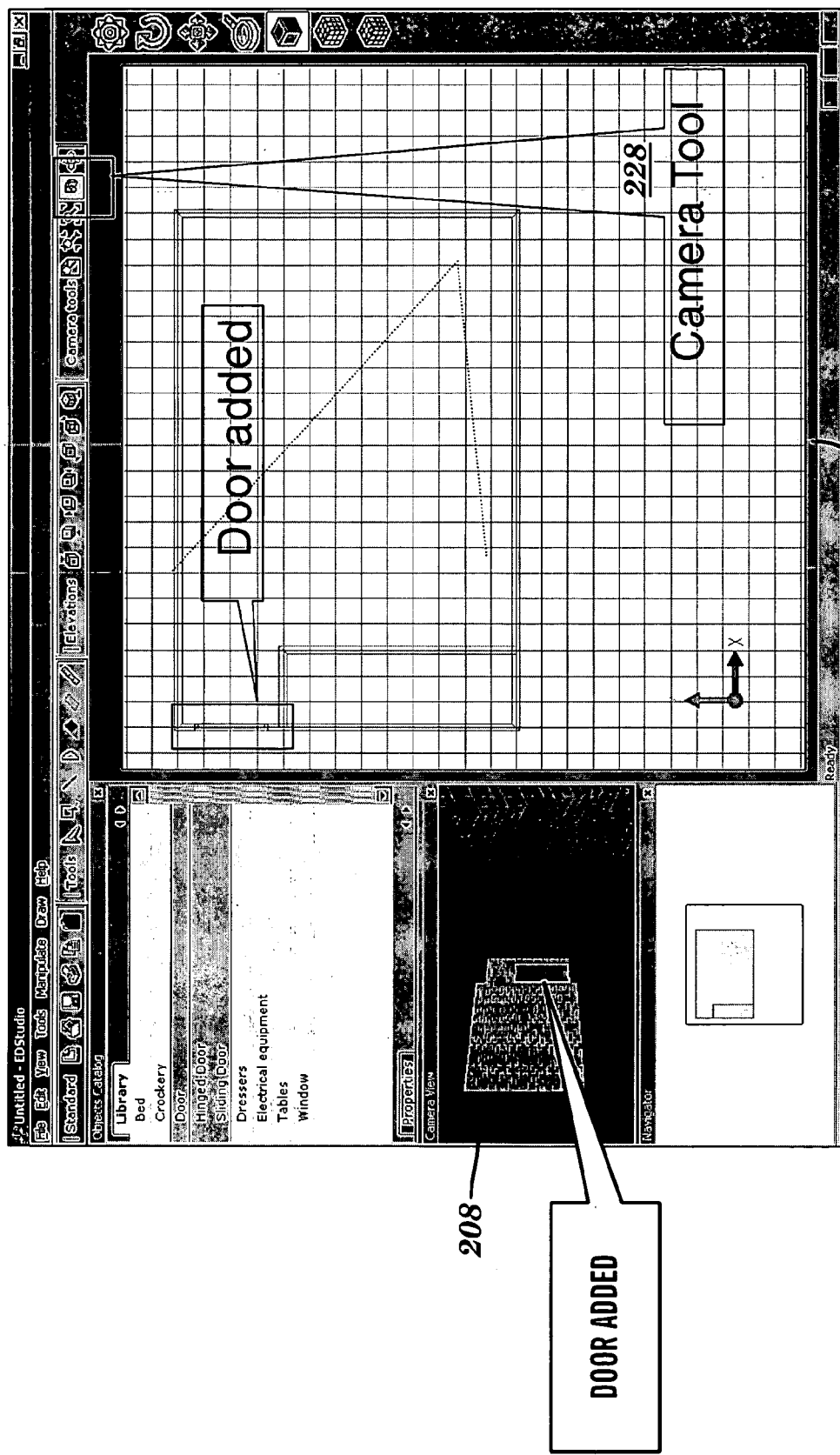
Figure 16:
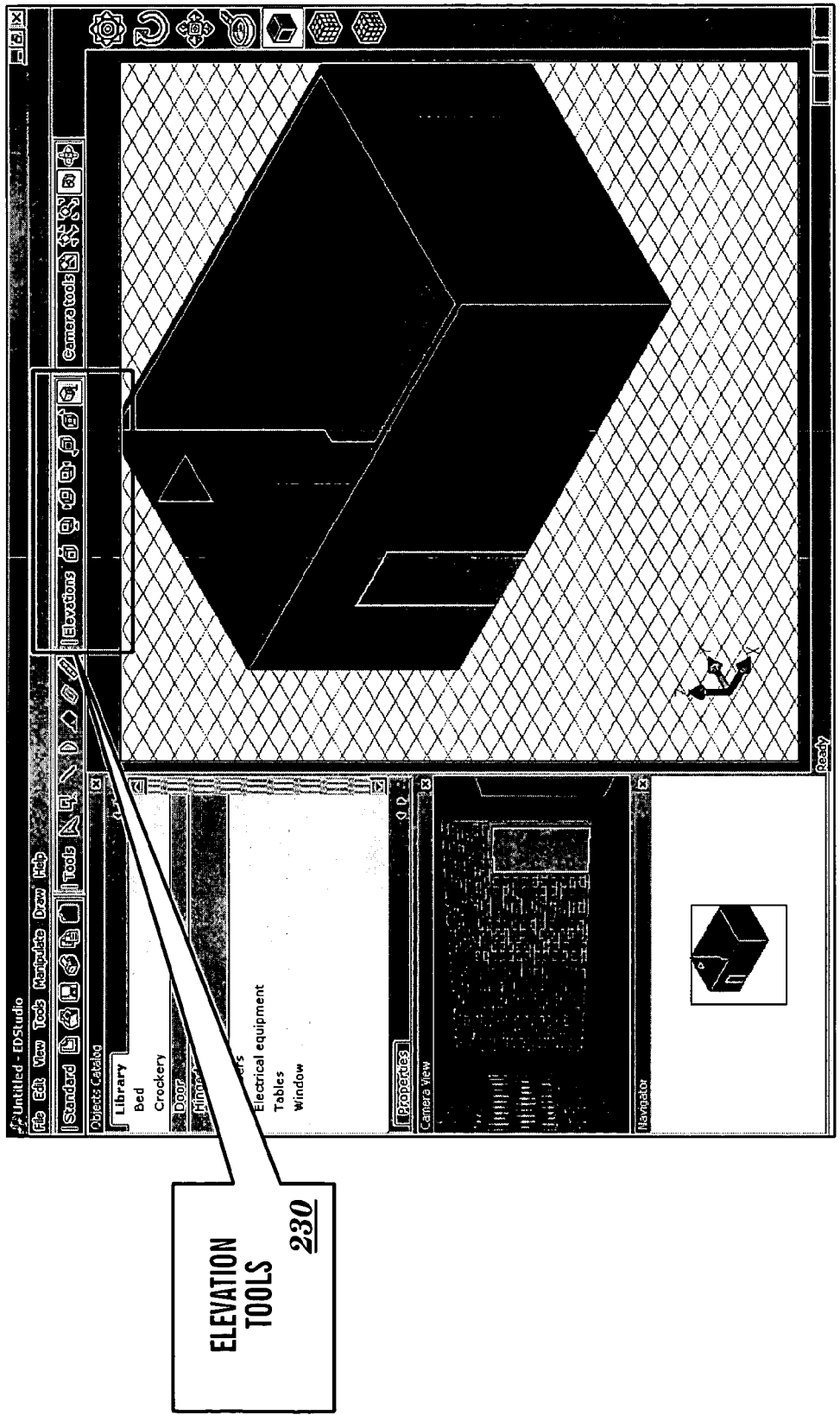

In FIG. 13, the user selects the exterior walls of the room, e.g., using selection tool 222, and then uses floor tool 224 to add a floor to the room. The newly added floor is shown in both work area 204 and in camera view 208. A door is selected by selecting the library 206, and selecting the desired door from the displayed list 226, as shown in FIG. 14. The cursor is then placed at the desired location on the wall to add the door to the room layout as shown in FIG. 15. The door may be viewed in wireframe mode as shown in work area 204, or in the camera view 208 once the user uses camera tool 228 to place the camera at an appropriate location in the work area 204. Turning to FIG. 16, elevation tools 230 may be used to change the view displayed in work area 204.

Figure 17:
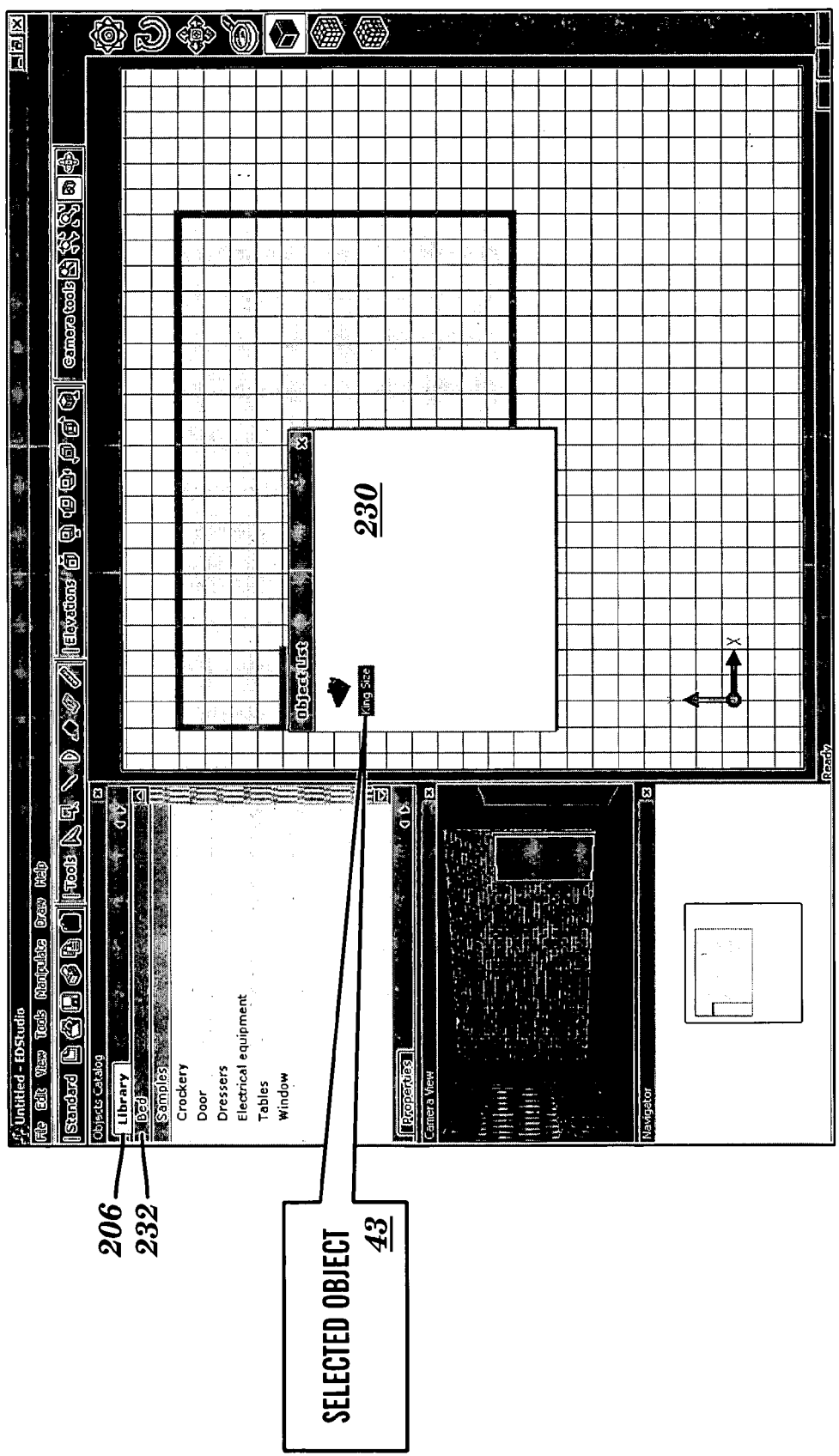
Figure 18:
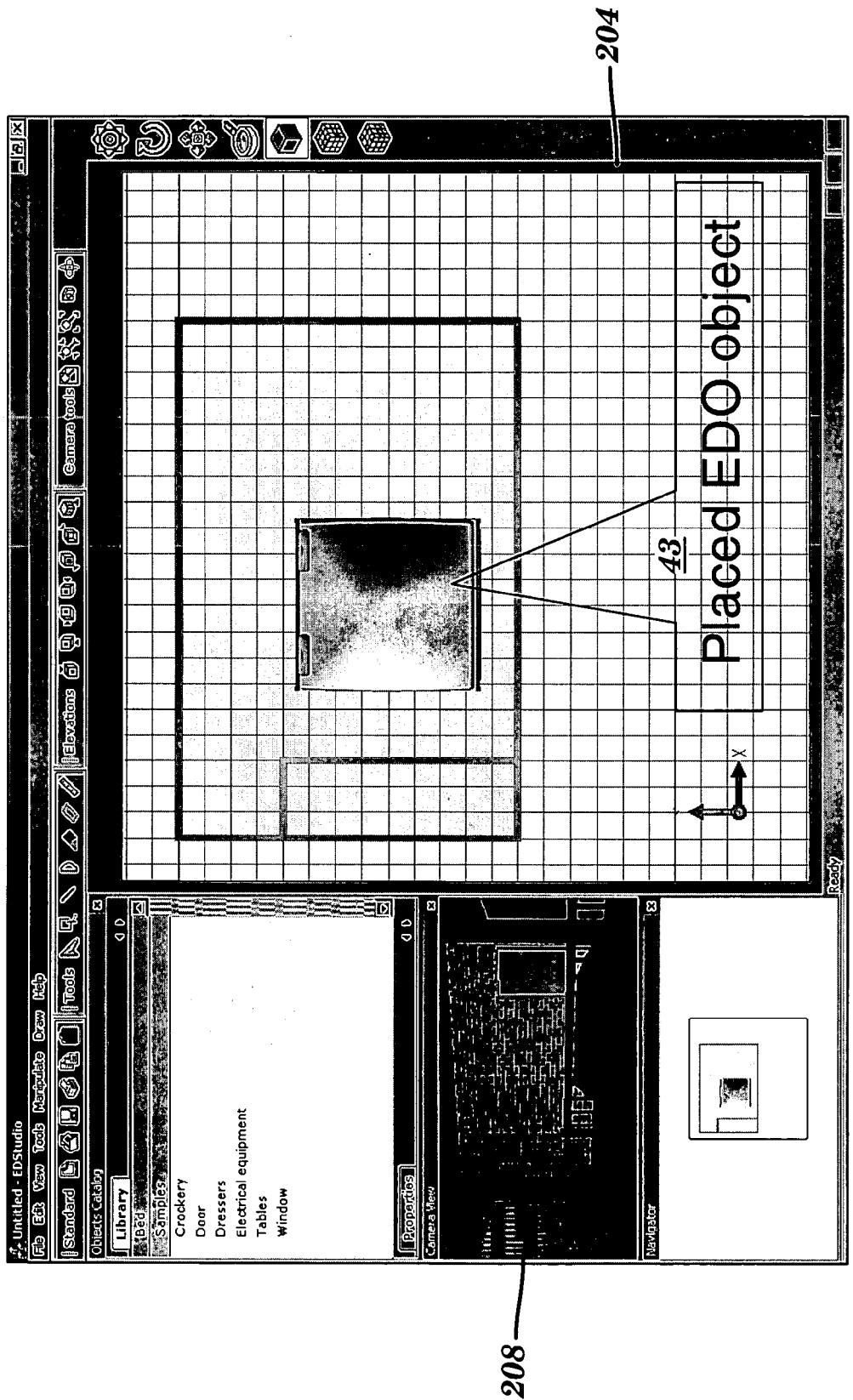
Figure 19:
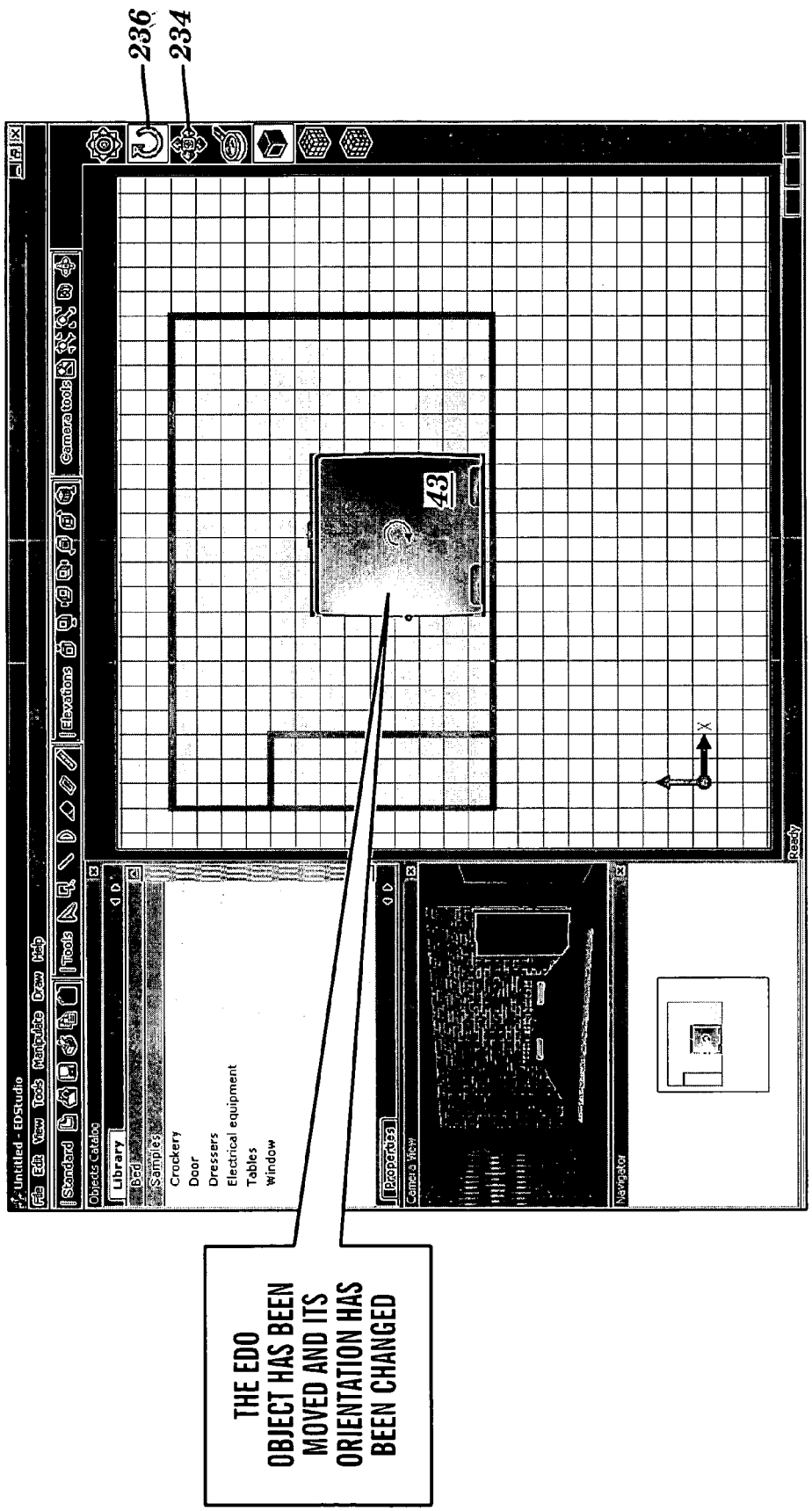
Figure 20:
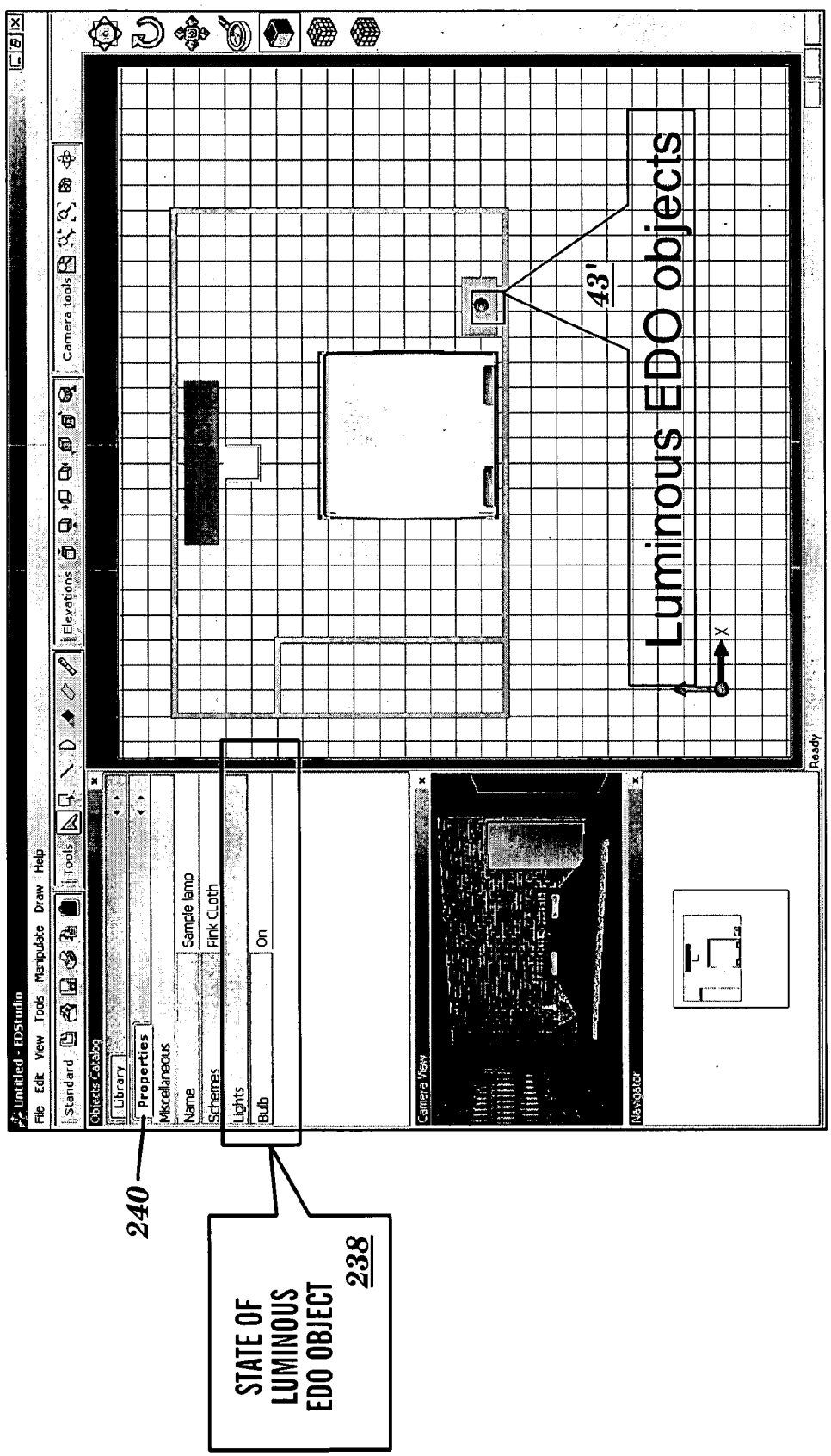
Figure 21:
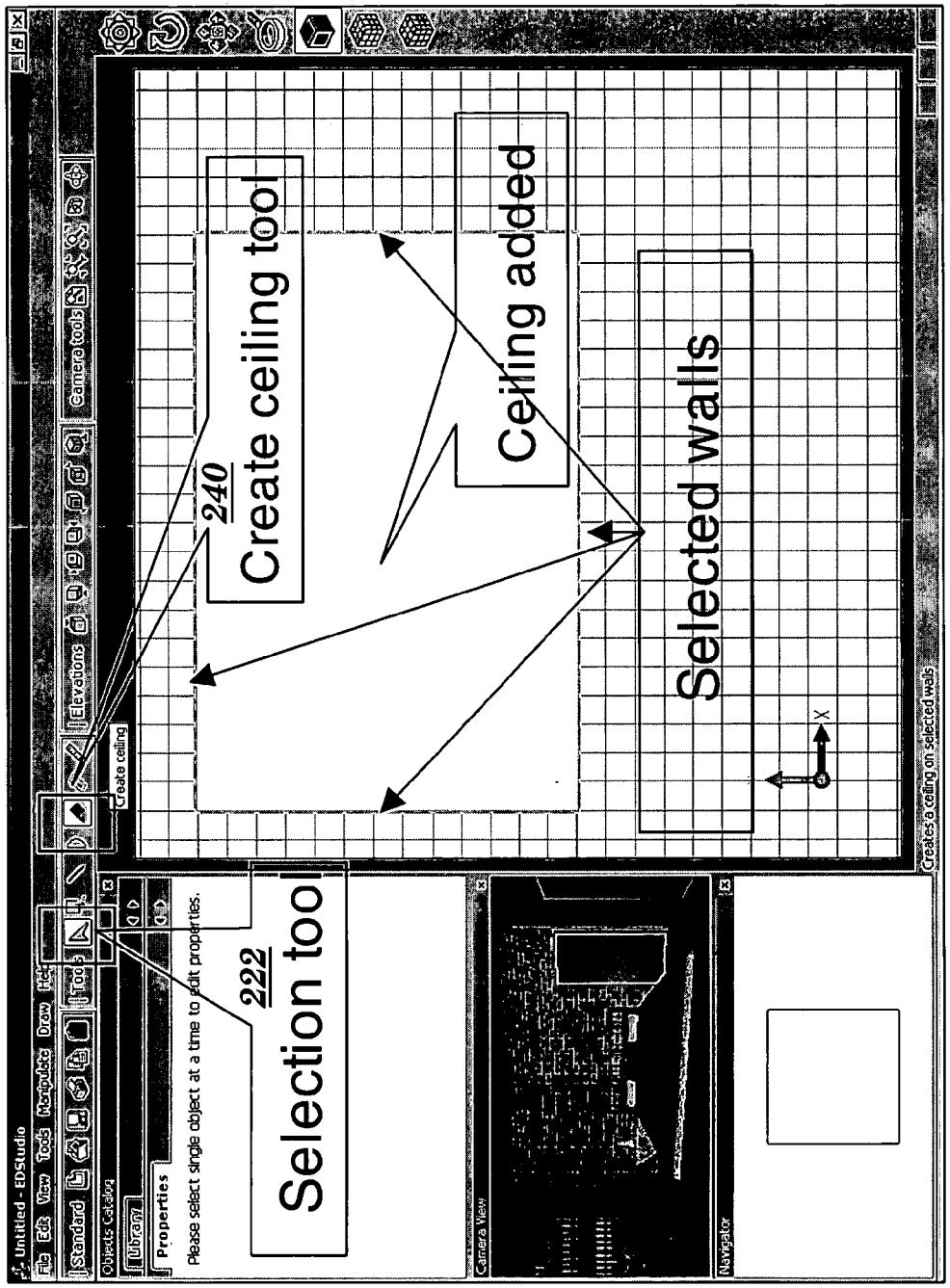

As shown in FIGS. 17 and 18, DO objects 43 may be selected from object list 230 which is displayed upon actuation of a desired menu item (e.g., 'bed' 232) of library 206. The selected object 43 is then placed in the room by dragging and dropping at a desired location within work area 204. As shown, the object 43 may be simultaneously displayed in camera view 208. Turning to FIG. 19, translation tool 234 and rotation tool 236 may be used to change the location and orientation of the object 43. Other objects 43 may be selected and similarly placed in the model. The state of luminous objects 43', such as lights, may be set either 'on' or 'off' in the state panel 238 of the 'Properties' window 240 (FIG. 20). A ceiling may be added in a manner similar to that of adding the floor, e.g., by selecting the exterior walls with selection tool 222, and selecting ceiling tool 240, as shown in FIG. 21.

Figure 22:
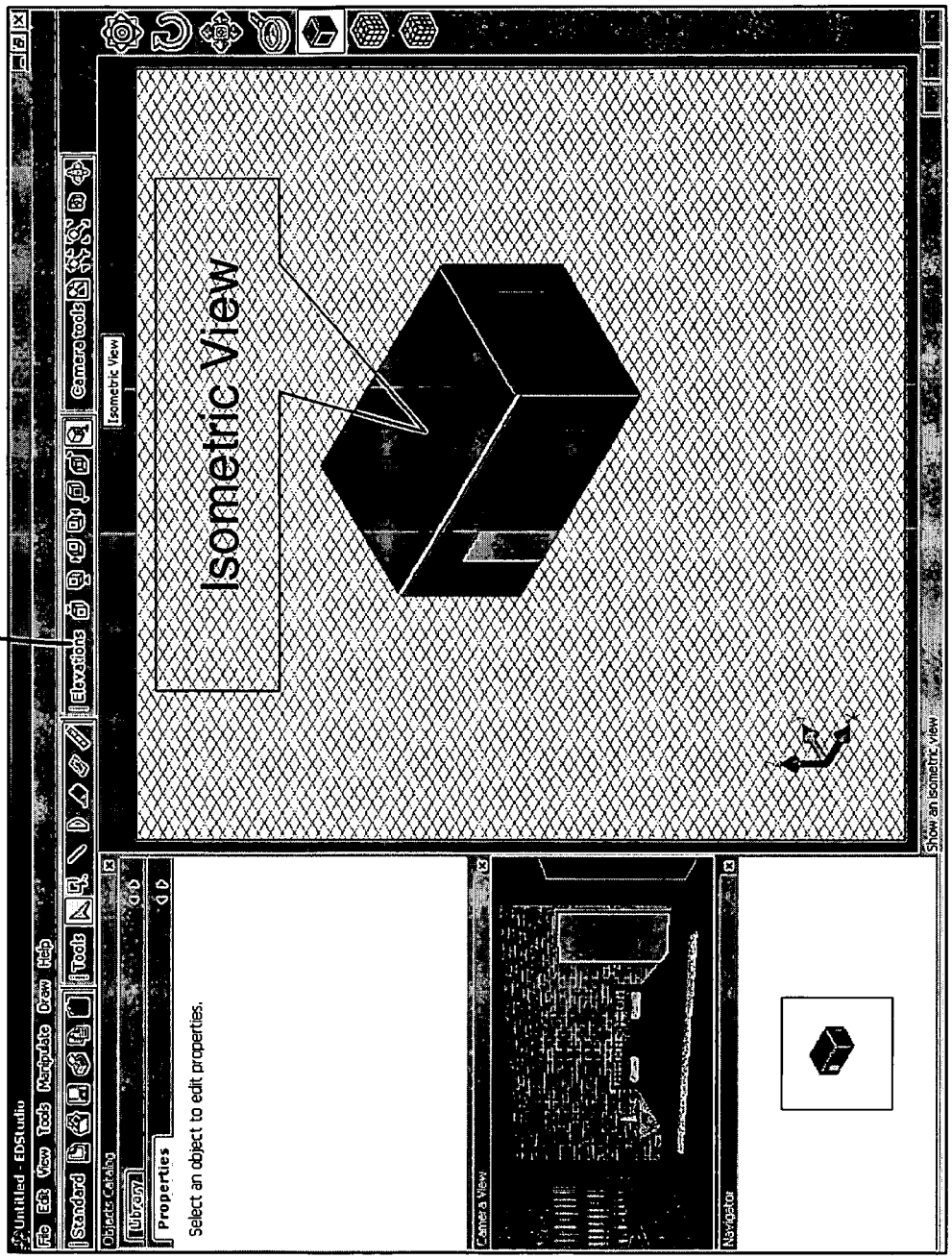

The completed model may be viewed in various elevations/views, such as isometric, using elevation tools 230 as shown in FIG. 22. Moreover, various sections of the room model may be viewed by placing the camera at various positions, using camera tool 228 as discussed hereinabove.

Figure 23:
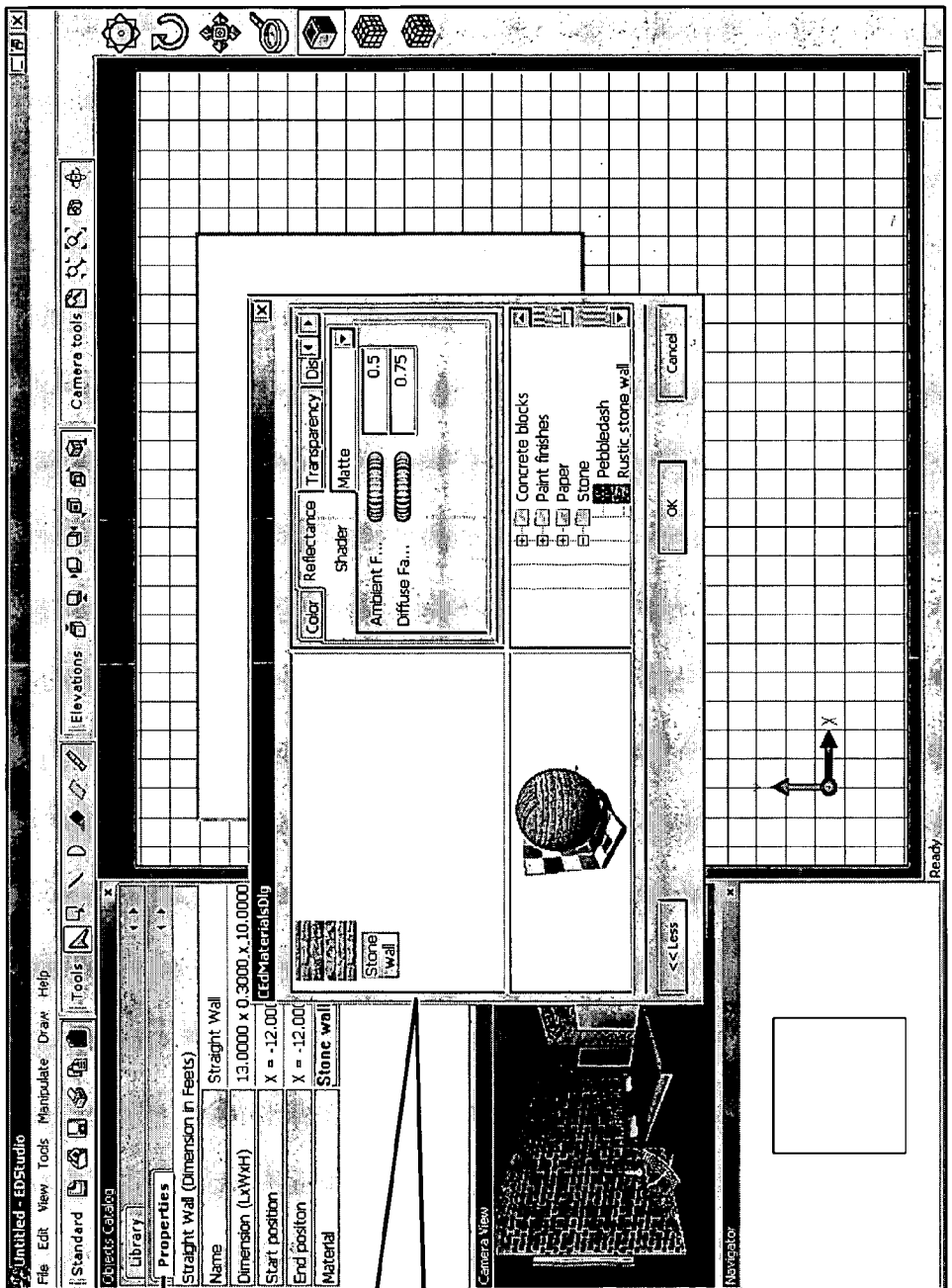
Figure 24:
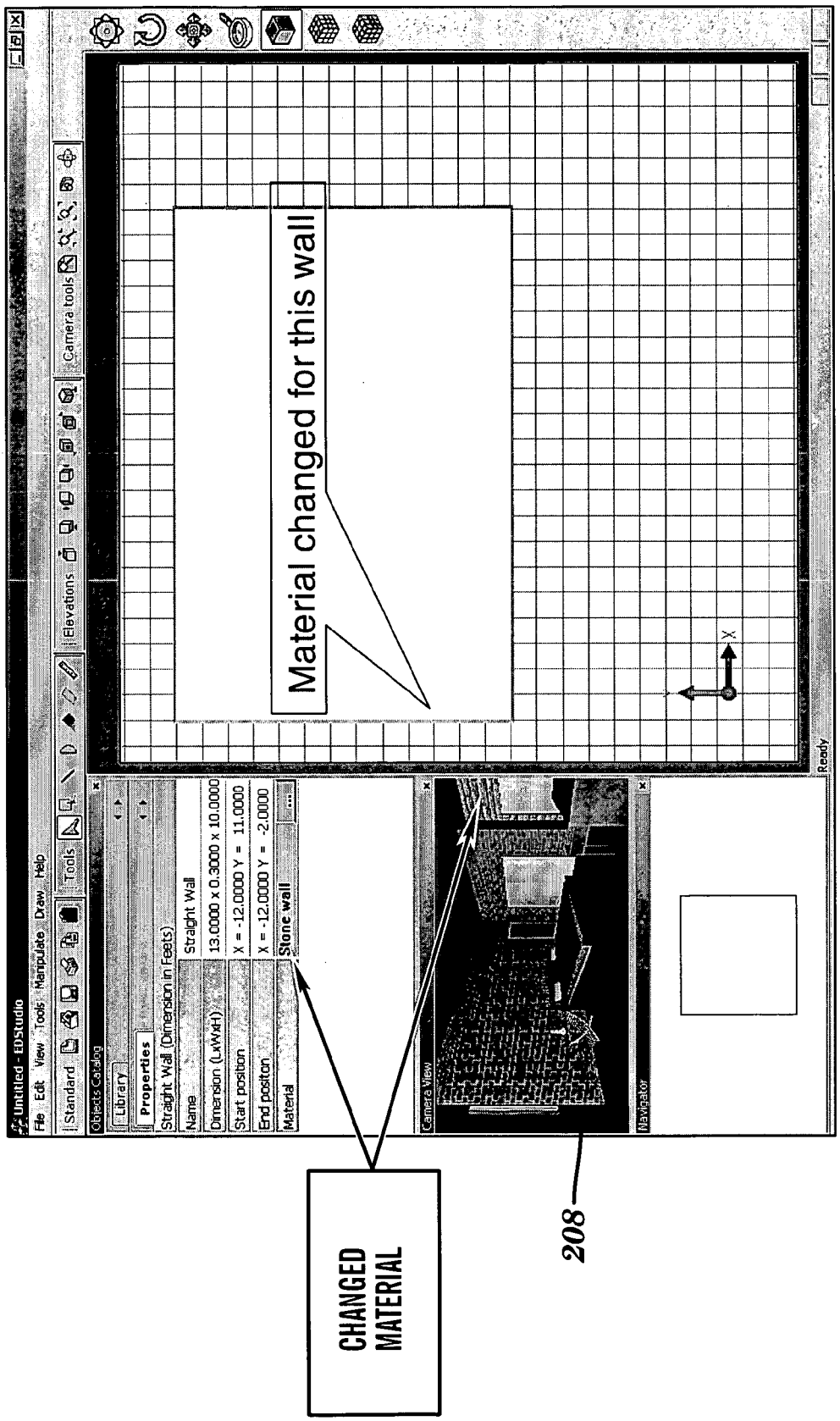
Figure 25:
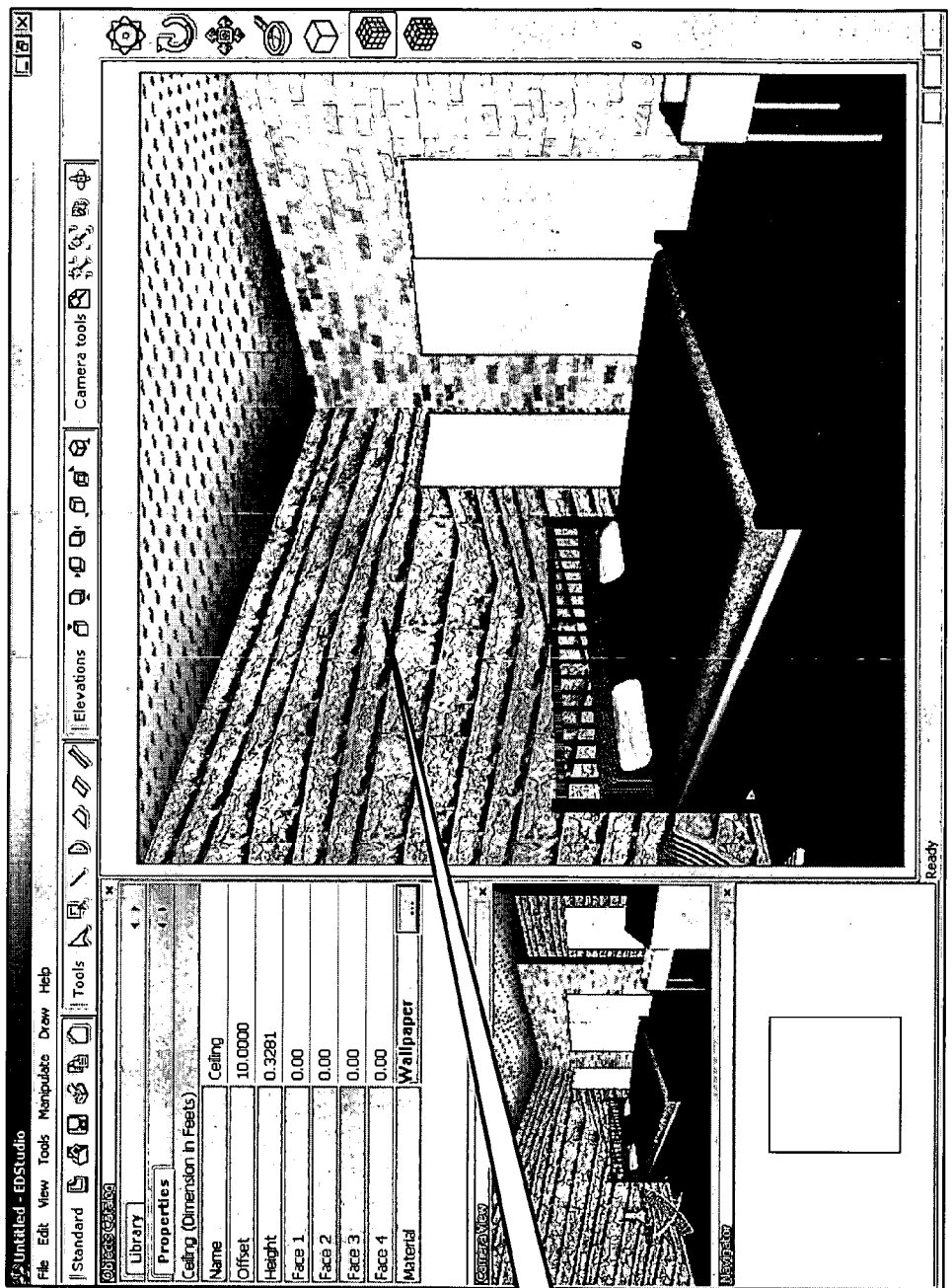
Figure 26:
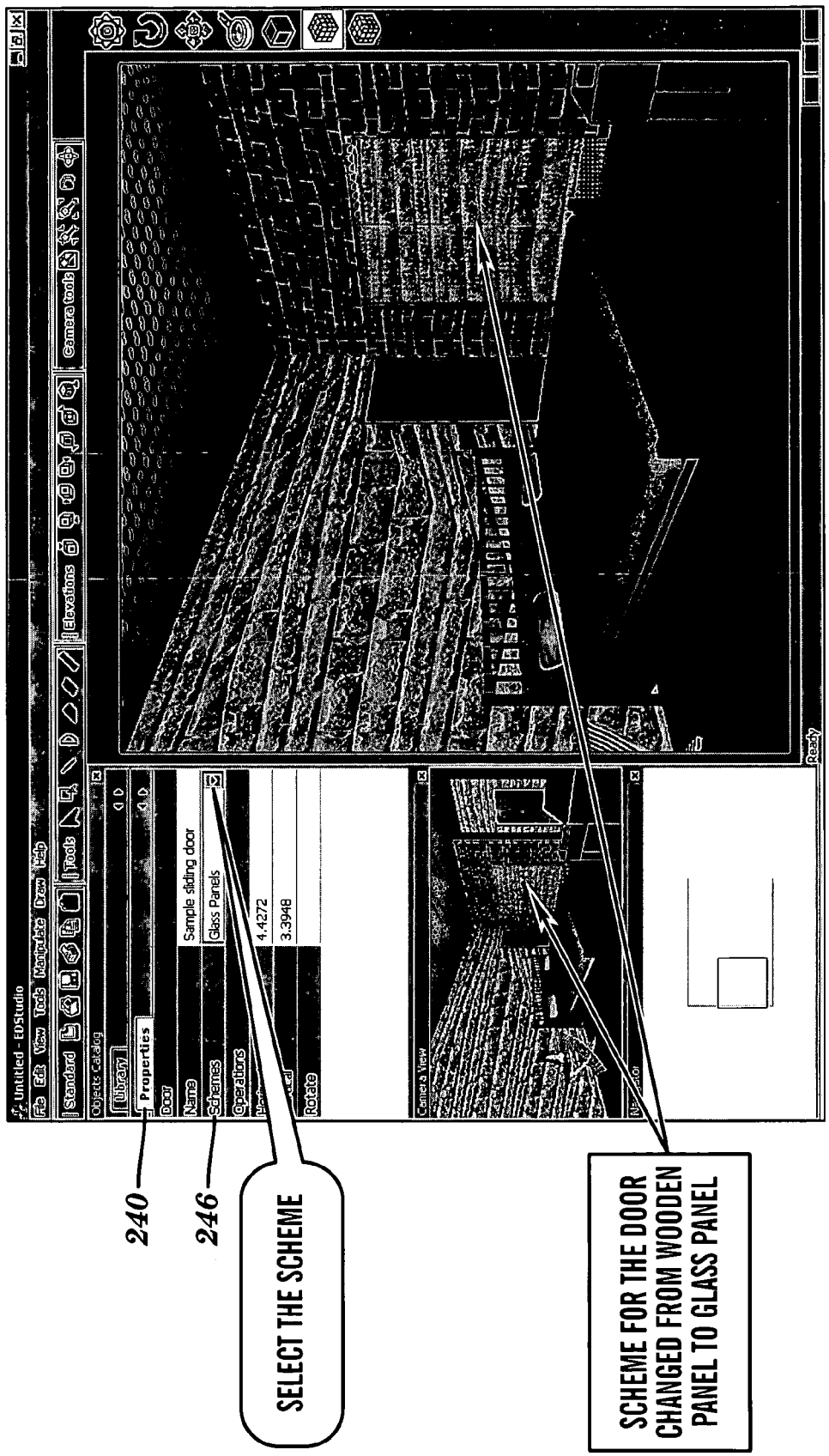

Turning now to FIGS. 23 and 24, as mentioned hereinabove, objects 43 are provided with default materials upon placement into work area 204. This default material may be changed or modified using material dialog 242, which may be accessed via properties dialog 240. The particular wall, and the new material, are shown in properties dialog 240 and in camera view 208 of FIG. 24. A low resolution/preview rendering 244 may then be displayed as shown in FIG. 25. This preview rendering 244 may be further modified, such as by changing the schemes of various objects, e.g., by changing the doors from opaque to glass panels, using the scheme dialog 246 under properties as shown in FIG. 26.

Figure 27:
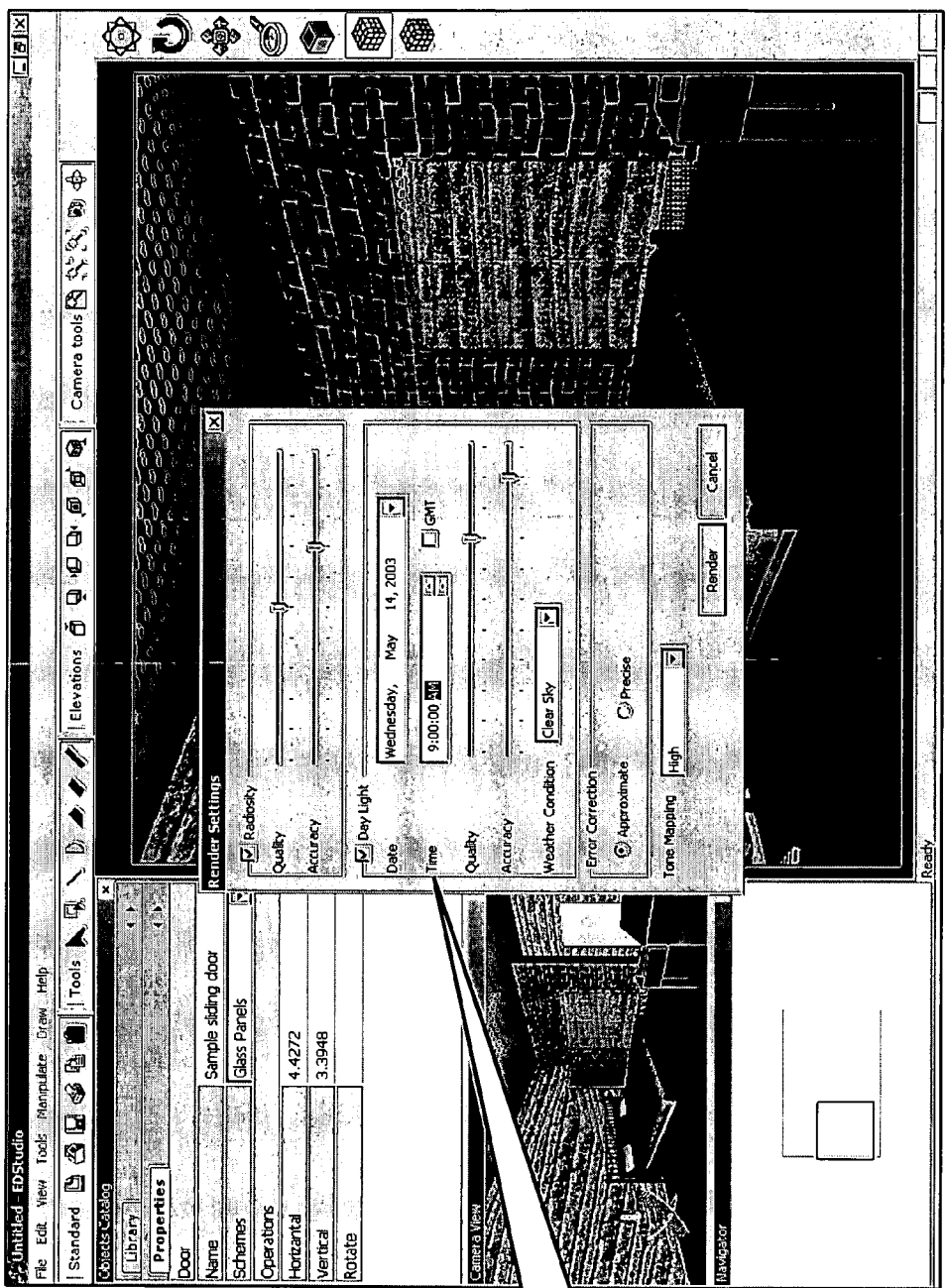
Figure 28:
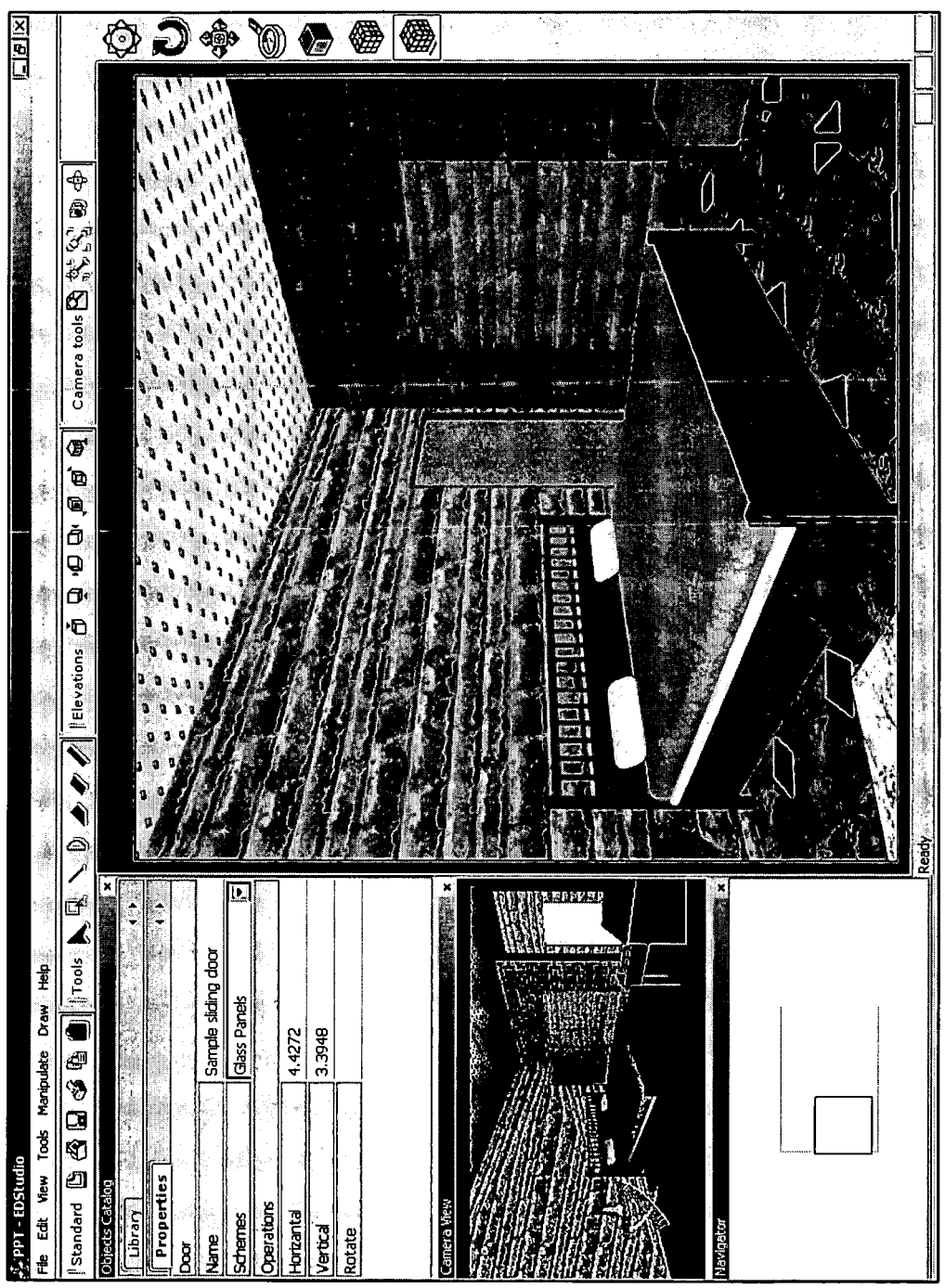
Figure 29:
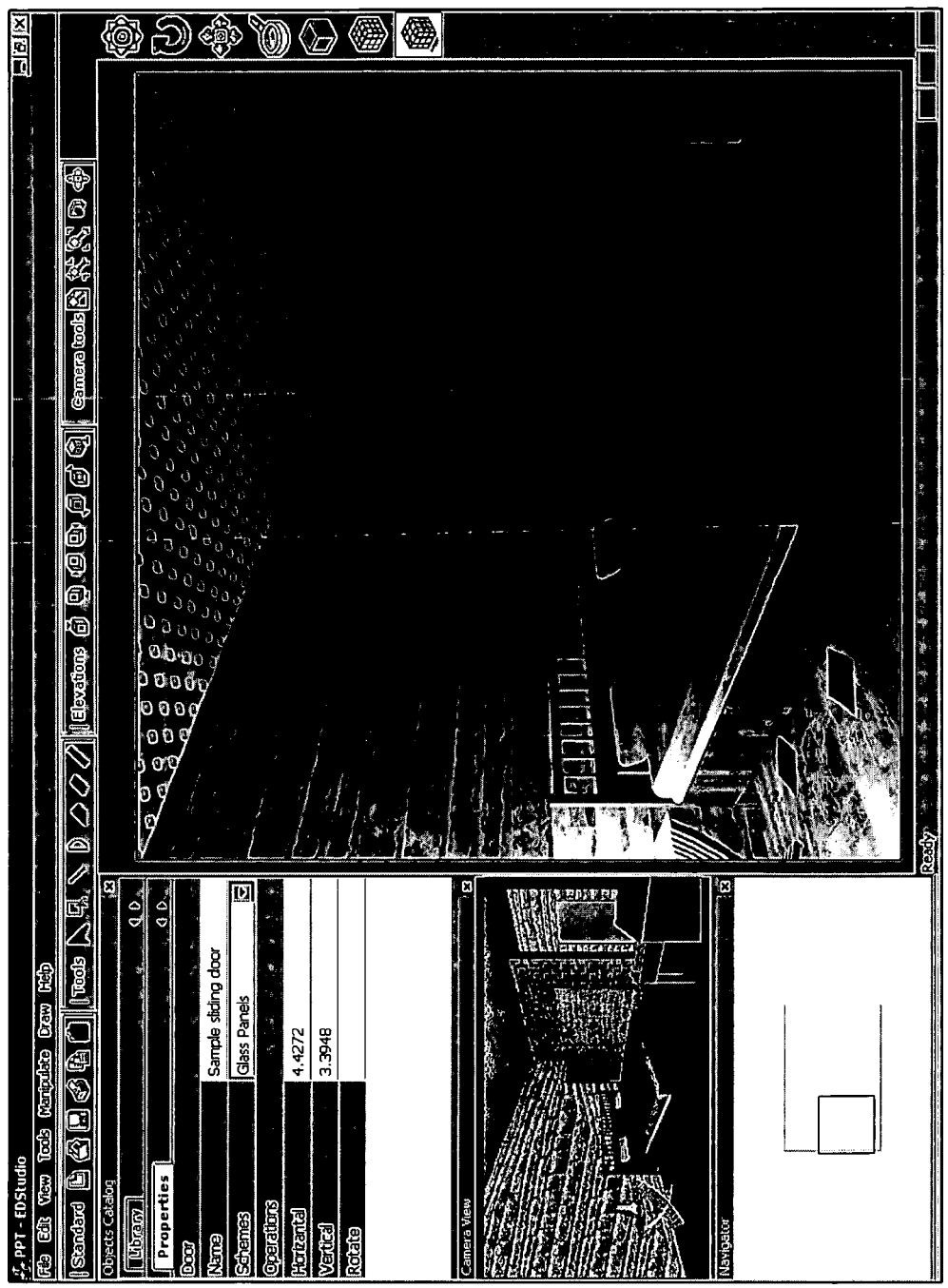

The system 12 may then render a high resolution 3D view, such as shown in FIG. 27, which incorporate daylight appropriate for the geographical orientation of the model, time of day, and various other settings available to the user via render settings dialog 248 which may be accessed via the File menu. Examples of high resolution renderings in the daytime (i.e., with high ambient lighting), and nighttime (i.e., with lighting from only a single electric light), are shown in FIGS. 28 and 29, respectively.

In the preceding specification, the invention has been described with reference to specific exemplary embodiments thereof. It may be evident that various modifications and changes may be made thereunto without departing from the broader spirit and scope of the invention as set forth in the claims that follow.

The specification and drawings are accordingly to be regarded in an illustrative rather than restrictive sense.

Having thus described the invention, what is claimed is:

1. A method in a client-server computing environment for generating and rendering a photorealistic three-dimensional (3D) perspective view of a 3D object selectively positioned within a 3D scene, the method comprising:
   (a) communicably accessing a server with a client;
   (b) operating with the client, a client application configured for scene editing and rendering, including a graphical user interface (GUI);
   (c) displaying a 3D scene with the GUI;
   (d) configuring the 3D scene for being selectively displayed in a plurality of views;
   (e) retrieving at least one 3D object from the server;
   (f) importing the 3D object into the 3D scene to generate a composite;
   (g) manipulating the 3D object within the composite for placement and orientation;
   (h) rendering a 3D image of the composite at the client;
   (i) selectively reconfiguring the 3D image in real time;
   (j) applying luminosity characteristics to the 3D image; and
   (k) rendering, with the client application, a photorealistic 3D view of the composite image, including the luminosity characteristics.

2. The method of claim 1, wherein said configuring (d) comprises selectively displaying the 3D scene in a plurality of views.

3. The method of claim 2, comprising simultaneously displaying the 3D scene in a plurality of views.

4. The method of claim 1, wherein said selectively reconfiguring (i) comprises manipulating the 3D object within the 3D image.

5. The method of claim 1, wherein said selectively reconfiguring (i) comprises selectively rotating the 3D image to display the 3D scene in a plurality of views.

6. The method of claim 1, wherein said displaying (c) comprises generating a scene with the client application.

7. The method of claim 1, wherein said displaying (c) comprises downloading a scene from the server.

8. The method of claim 1, comprising wherein said retrieving (e) further comprises storing the at least one 3D object at the client.

9. The method of claim 1, wherein said retrieving (e) comprises retrieving a plurality of objects.

10. The method of claim 9, wherein at least one of said plurality of objects comprises the 3D scene.

11. The method of claim 1, wherein said displaying (c) comprises displaying a perspective view of the 3D scene.

12. The method of claim 11, wherein said displaying (c) further comprises displaying a two-dimensional (2D) view of the 3D scene simultaneously with the perspective view.

13. The method of claim 12, wherein said manipulating (g) comprises manipulating the 3D object in one of the perspective and 2D views.

14. The method of claim 13, comprising automatically updating an other of the perspective and 2D views in response to said manipulating (g).

15. The method of claim 1, wherein said displaying (c) comprises displaying a two-dimensional (2D) view of the 3D scene.

16. The method of claim 1, wherein the importing (f) comprises importing the 3D object into a 2D view of the 3D scene to generate a composite.

17. The method of claim 1, wherein said manipulating (g) comprises manipulating the 3D object within the composite for scale.

18. The method of claim 1, wherein said operating (b) comprises retrieving the client application from the server and storing the client application at the client.

19. The method of claim 1, wherein the retrieving (e) comprises retrieving product ordering information associated with the object, the product ordering information being selected from the group consisting of available materials, available textures and finishes, available sizes, available colors, cost, quantity, and manufacturing lead times.

20. The method of claim 19, wherein the retrieving (e) comprises automatically receiving updated objects including the product ordering information therefor, from the server.

21. The method of claim 20, comprising:
(1) calculating total project cost by aggregating the product ordering information for the selected objects.

22. The method of claim 21, wherein the calculating (1) comprises calculating square footage of surfaces to generate quantity data for surface coverings.

23. The method of claim 22, wherein the surface coverings are selected from the group consisting of paint, wallpaper, and carpeting.

24. A method in a client-server computing environment for generating and rendering a photorealistic three-dimensional (3D) perspective view of a 3D object selectively positioned within a 3D scene, the method comprising:
(a) loading a plurality of 3D objects onto a server, at least one of the 3D objects representing a product;
(b) loading product ordering information for each product onto the server;
(c) loading a client application configured for scene editing, applying luminosity, and rendering, including a graphical user interface (GUI), onto the server;
(d) combining the plurality of 3D objects, with their integrated product ordering information, to form integrated 3D objects;
(e) converting the integrated 3D objects into a format usable by the client application;
(f) storing the integrated formatted 3D objects in a server library;
(g) communicably coupling the server to a client;
(h) transmitting the client application to the client;
(i) transmitting selected ones of plurality of 3D objects from the server library to a client library;
(j) automatically updating the plurality of 3D objects in the server library, including their associated product ordering information;
(k) automatically transmitting updates for the selected ones of 3D objects in the server library, to the client;

wherein a user manipulates and applies luminosity to the selected 3D objects with the client application to generate a photorealistic 3D scene at the client.

25. The method of claim 24, wherein the product ordering information is selected from the group consisting of available materials, available textures, available sizes, available colors, cost, quantity, and manufacturing lead times.

26. A computer system in an interactive medium for generating and rendering a photorealistic three-dimensional (3D) perspective view of a 3D object selectively positioned within a 3D scene, said system comprising:
a server including:
a plurality of 3D objects, each of the 3D objects representing a product;
product ordering information for each of the plurality of objects;
integrated 3D objects, including the plurality of 3D objects with their integrated product ordering information;
a converter configured to convert the integrated 3D objects into a format usable by the client application;
a server library containing the formatted, integrated 3D objects;
a communication module configured to communicably couple the server to a client;
an update module configured to automatically update the plurality of 3D objects in the server library for dimensional and product ordering changes;
a client communicably couplable to the server, the client including:
a communication module configured to access the server;
a client application configured for scene editing and rendering, including a graphical user interface (GUI);
a 3D scene;
a display module configured selectively display the 3D scene in a plurality of views;
a retrieval module configured to retrieve at least one 3D object from the server;
an import module configured to import the 3D object into the 3D scene to generate a composite;
a manipulation module to manipulate the 3D object within the composite for placement and orientation;
a first rendering engine for rendering a 3D image of the composite at the client;
a reconfiguration module to selectively reconfigure the 3D image in real time;
a luminosity module to apply luminosity characteristics to the 3D image; and
a second rendering engine configured to render a photorealistic 3D view of the composite image, including the luminosity characteristics.

27. A computer system in an interactive medium for generating customized graphical documents, said system comprising a client communicably couplable to a server;
said client including:
a communication module configured to access the server;
a client application configured for scene editing and rendering, including a graphical user interface (GUI);
a 3D scene;
a display module configured selectively display the 3D scene in a plurality of views;
a retrieval module configured to retrieve at least one 3D object from the server;
an import module configured to import the 3D object into the 3D scene to generate a composite;

a manipulation module to manipulate the 3D object within the composite for placement and orientation;

a first rendering engine for rendering a 3D image of the composite at the client;

a reconfiguration module to selectively reconfigure the 3D image in real time;

a luminosity module to apply luminosity characteristics to the 3D image; and a second rendering engine configured to render a photorealistic 3D view of the composite image, including the luminosity characteristics.

28. An article of manufacture for generating customized graphical documents, said article of manufacture comprising a computer usable medium having computer readable program code embodied therein for:

providing a server with:

a plurality of 3D objects, each of the 3D objects representing a product;

product ordering information for each of the plurality of objects;

a client application configured for scene editing and rendering, including a graphical user interface (GUI);

integrated 3D objects including the plurality of 3D objects with their integrated product ordering information;

a converter configured to convert the integrated 3D objects into a format usable by the client application;

a server library containing the integrated 3D objects, formatted into the format usable by the client application;

a communication module configured to communicably couple the server to a client; and an update module configured to automatically update the plurality of 3D objects in the server library for dimensional and product ordering changes;

computer readable program code for providing a client with:

a communication module configured to access the server;

a client application configured for scene editing and rendering, including a graphical user interface (GUI);

a 3D scene;

a display module configured selectively display the 3D scene in a plurality of views;

a retrieval module configured to retrieve at least one 3D object from the server;

an import module configured to import the 3D object into the 3D scene to generate a composite;

a manipulation module to manipulate the 3D object within the composite for placement and orientation;

a first rendering engine for rendering a 3D image of the composite at the client;

a reconfiguration module to selectively reconfigure the 3D image in real time;

a luminosity module to apply luminosity characteristics to the 3D image; and a second rendering engine configured to render a photorealistic 3D view of the composite image, including the luminosity characteristics.

29. Computer readable program code for generating customized graphical documents, said computer readable program code being disposed on a computer readable medium, and configured for providing a server with:

a plurality of 3D objects, each of the 3D objects representing a product;

product ordering information for each of the plurality of objects;

a client application configured for scene editing and rendering, including a graphical user interface (GUI);

integrated 3D objects including the plurality of 3D objects with their integrated product ordering information;

a converter configured to convert the integrated 3D objects into a format usable by the client application;

a server library containing the integrated 3D objects, formatted into the format usable by the client application;

a communication module configured to communicably couple the server to a client; and an update module configured to automatically update the plurality of 3D objects in the server library for dimensional and product ordering changes; and computer readable program code for providing a client with:

a communication module configured to access the server;

a client application configured for scene editing and rendering, including a graphical user interface (GUI);

a 3D scene;

a display module configured selectively display the 3D scene in a plurality of views;

a retrieval module configured to retrieve at least one 3D object from the server;

an import module configured to import the 3D object into the 3D scene to generate a composite;

a manipulation module to manipulate the 3D object within the composite for placement and orientation;

a first rendering engine for rendering a 3D image of the composite at the client;

a reconfiguration module to selectively reconfigure the 3D image in real time;

a luminosity module to apply luminosity characteristics to the 3D image; and a second rendering engine configured to render a photorealistic 3D view of the composite image, including the luminosity characteristics.

30. A method for generating and rendering a photorealistic three-dimensional (3D) perspective view of a 3D object selectively positioned within a 3D scene, the method comprising:

(a) operating a client application configured for scene editing and rendering, including a graphical user interface (GUI);

(b) displaying a 3D scene with the GUI;

(c) configuring the 3D scene for being selectively displayed in a plurality of views;

(d) retrieving at least one 3D object from a library;

(e) importing the 3D object into the 3D scene to generate a composite;

(f) manipulating the 3D object within the composite for placement and orientation;

(g) rendering a 3D image of the composite with the client application;

(h) selectively reconfiguring the 3D image in real time;

(i) applying luminosity characteristics to the 3D image; and (j) rendering, with the client application, a photorealistic 3D view of the composite image, including the luminosity characteristics.

* * * * *

UNITED STATES PATENT AND TRADEMARK OFFICE
CERTIFICATE OF CORRECTION

PATENT NO. : 7,277,572 B2 Page 1 of 1
APPLICATION NO. : 10/683825
DATED : October 2, 2007
INVENTOR(S) : Cathryn MacInnes and Gerald Pearlstein It is certified that error appears in the above-identified patent and that said Letters Patent is hereby corrected as shown below:

On the Title Pg
Item (73) Assignee: "MacPearl Design LLC, Boston, MA (US)", should read -- Cathryn MacInnes, North Reading, MA (US); Gerald Pearlstein, North Reading, MA (US) --.

Signed and Sealed this

Eighteenth Day of May, 2010

David J. Kappos
*Director of the United States Patent and Trademark Office*